(12) United States Patent
Yanagihara et al.

(10) Patent No.: US 7,593,464 B2
(45) Date of Patent: *Sep. 22, 2009

(54) INFORMATION PROCESSING APPARATUS AND METHOD, AND PROGRAM STORAGE MEDIUM

(75) Inventors: Naofumi Yanagihara, Tokyo (JP); Nobuaki Izumi, Chiba (JP)

(73) Assignee: Sony Corporation, Tokyo (JP)

( * ) Notice: Subject to any disclaimer, the term of this patent is extended or adjusted under 35 U.S.C. 154(b) by 374 days.

This patent is subject to a terminal disclaimer.

(21) Appl. No.: 11/082,022

(22) Filed: Mar. 16, 2005

(65) Prior Publication Data
US 2005/0157788 A1     Jul. 21, 2005

Related U.S. Application Data

(63) Continuation of application No. 09/341,401, filed on Aug. 23, 1999, now Pat. No. 6,963,606.

(51) Int. Cl.
*H04B 1/66* (2006.01)
(52) U.S. Cl. .............. 375/240.24; 375/240.25; 375/240.04; 375/240.03; 375/240.16; 375/240.12; 375/240.26; 382/233; 382/235; 382/251; 382/238; 382/236
(58) Field of Classification Search ............. 375/240.24, 375/240.25, 240.16, 240.12, 240.26, 240.04, 375/240.03; 382/233, 235, 238, 236, 251
See application file for complete search history.

(56) References Cited

U.S. PATENT DOCUMENTS 5,262,854 A   11/1993   Ng
5,453,788 A   9/1995   Matsushima et al.
5,657,015 A * 8/1997   Nakajima et al. ............. 341/61

(Continued)

FOREIGN PATENT DOCUMENTS

EP        0 696 780        2/1996

(Continued)

OTHER PUBLICATIONS

Uchida H et al: "DVCPRO: A Comprehensive Format Overview" SMPTE Journal, SMPTE Inc. Scarsdale, N.Y, US, vol. 105, No. 7, Jul. 1996, pp. 406-418, XP000597144 ISSN: 0036-1682.

(Continued)

*Primary Examiner*—Shawn An
(74) *Attorney, Agent, or Firm*—Frommer Lawrence & Haug LLP; William S. Frommer; Ellen Marcie Emas

(57) ABSTRACT

An inputted digital signal of a first format (DV video signal) is restored to a variable-length code by having its framing cancelled by a de-framing section 11, then decoded by a variable-length decoding (VLD) section 12, inversely quantized by an inverse quantizing (IQ) section 13, and inversely weighted by an inverse weighting (IW) section 14. Then, required resolution conversion in the orthogonal transform domain (frequency domain) is carried out on the inversely weighted video signal by a resolution converting section 16. After that, the video signal having the resolution converted is weighted by a weighting (W) section 18, then quantized by a quantizing (Q) section 19, coded by variable-length coding by a variable-length coding (VLC) section 20, and outputted as a digital signal of a second format (MPEG video signal).

6 Claims, 27 Drawing Sheets

U.S. PATENT DOCUMENTS

| | | | |
|---|---|---|---|
| 5,699,117 | A | 12/1997 | Uramoto et al. |
| 5,737,019 | A * | 4/1998 | Kim ............... 375/240.25 |
| 5,982,432 | A | 11/1999 | Uenoyama et al. |
| 6,005,623 | A | 12/1999 | Takahashi et al. |
| 6,078,617 | A | 6/2000 | Nakagawa et al. |
| 6,307,592 | B1 | 10/2001 | Go |
| 6,999,512 | B2 * | 2/2006 | Yoo et al. ............ 375/240.03 |

FOREIGN PATENT DOCUMENTS

| | | |
|---|---|---|
| EP | 0 699 004 | 2/1996 |
| EP | 0 932 106 | 7/1999 |
| JP | 5 111005 | 4/1993 |
| JP | 6 70174 | 3/1994 |
| JP | 7 203443 | 8/1995 |
| JP | 8 65663 | 3/1996 |
| JP | 9 219861 | 8/1997 |
| JP | 10 164593 | 6/1998 |
| WO | WO 97 13371 | 4/1997 |

OTHER PUBLICATIONS

With De P H N et al: "Design Considerations of the Video Compression System of the new DV Camcorder Standard" IEEE Transactions on Consumer Electronics, IEEE Service Center, New York, NY, US, vol. 43, No. 4, Nov. 1, 1997, pp. 1160-1179, XP000768571 ISSN: 0098-3063.

Imed Ben Dhaou et al: "DVC Decompression with Denoising for Picture Quality Improvement" IEEE Transactions on Consumer Electronics, (International Conference on Consumer Electronics, Rosemont, USA, Jun. 11-13, 1997), vol. 43, No. 3, Aug. 1997, pp. 911-917, XP011083623 New York, NY, USA, IEEE.

Liang-Wei Lee et al: "On The Error Distribution and Scene Change For The Bit Rate Control of MPEG" Digest of Technical Papers, IEEE 1993 International Conference on Consumer Electronics, Rosemont, USA Jun. 8-10, 1993, pp. 286-287, XP010107287 New York, NY, USA, IEEE ISBN: 0-7803-0843-3.

Seung-Kwon Paek et al: "A Mode-Changeable 2-D DCT/IDCT Processor for Digital VCR" IEEE Transactions on Consumer Electronics ) International Conference on Consumer Electronics, Rosemont, USA, Jun. 5-7, 1996), vol. 42, No. 3, Aug. 1996, pp. 606-616, XP01 1083496 New York, NY, USA, IEEE.

Shih-Fu Chang et al: "Manipulation and Compositing of MC-DCT Compressed Video" IEEE Journal on Selected Areas in Communications, IEEE Inc. New York, US, vol. 13, No. 1, Jan. 1995, pp. 1-11, XP000492740, ISSN: 0733-8716.

Shen D et al: "Adaptive motion vector resampling for compressed video down-scaling" Image Processing, 1997. Proceedings., International Conference on Santa Barbara, CA, USA Oct. 26-29, 1997, Los Alamitos, CA, USA,IEEE Comput. Soc. US, vol. 1, Oct. 26, 1997, pp. 771-774, XP010254070 ISBN: 0-8186-8183-7.

Feng J et al: "Adaptive block matching motion estimation algorithm for video coding" Electronics Letters, IEE Stevenage, GB, vol. 31, No. 18, Aug. 31, 1995, pp. 1542-1543, XP006003304 ISSN: 0013-5194.

Hasegawa K et al: "Low-Power Video Encoder/Decoder Chip Set for Digital VCR 'S" IEEE Journal of Solid-State Circuits, IEEE Service Center, Piscataway, NJ, US, vol. 31, No. 11, Nov. 1, 1996, pp. 1780-1788, XP000691463 ISSN: 0018-9200 Section II., pp. 1780-1783.

International Organization for Standardization=Organisation Internationale De Normalisation: "Test Model 5" MPEG Test Model 5. ISO-IEC/JTCI/SC29/WG11/NO400. Coded Representation of Picture and Audio Information. Document AVC-491B, Version 2: Apr. 1993, Geneva, ISO, CH, 1993, pp. 1-119, XP001150695 Section 3, pp. 13-23 Section 6, p. 31 Section 7, pp. 32-33 Appendix D, pp. 63-72.

Merhav N et al: "A Transform Domain Approach to Spatial Domain Image Scaling" 1996 IEEE International Conference on Acoustics, Speech, and Signal Processing—Proceedings. (ICASSP). Atlanta, May 7-10, 1996, IEEE International Conference on Acoustics, Speech, and Signal Processing—Proceedings. (ICASSP), New York, IEEE, US, vol. vol. 4 Conf. 21, May 1996, pp. 2403-2406, XP000669702 ISBN: 0-7803-3193-1.

* cited by examiner $$\begin{bmatrix} c0 \\ c1 \\ c2 \\ c3 \\ c4 \\ c5 \\ c6 \\ c7 \end{bmatrix} = (8) \begin{bmatrix} & (8) & \\ & & \\ & \text{DCT8} & \\ & & \\ & & \end{bmatrix} (8) \begin{bmatrix} (4) & (4) \\ \text{IDCT4} & 0 \\ \hline 0 & \text{IDCT4} \end{bmatrix} \begin{bmatrix} a0 \\ a1 \\ a2 \\ a3 \\ \hline b0 \\ b1 \\ b2 \\ b3 \end{bmatrix}$$

TRANSFORM MATRIX D

FIG.6

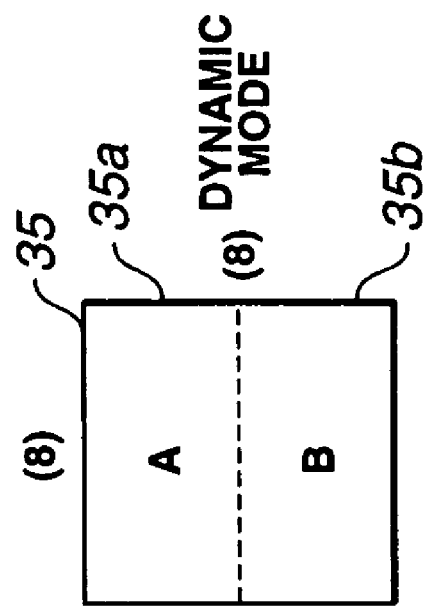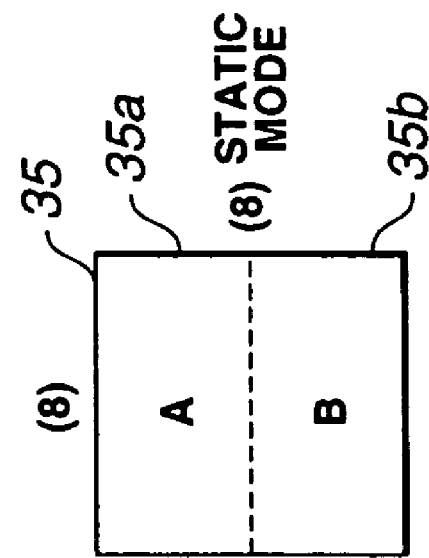
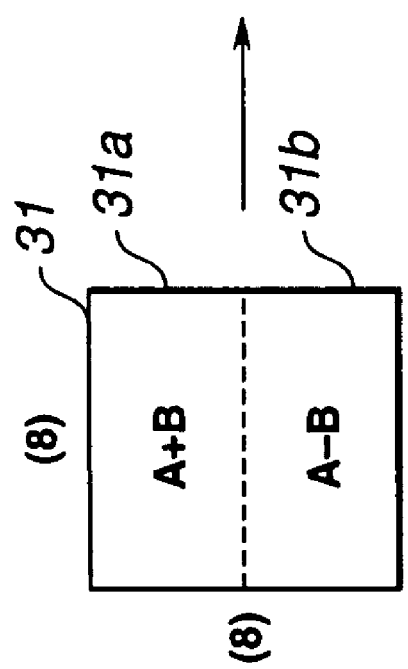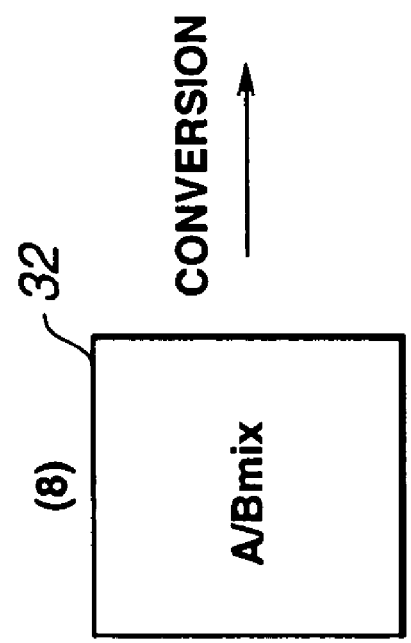
FIG.7A    FIG.7B

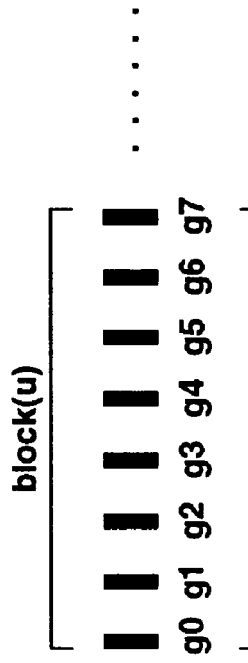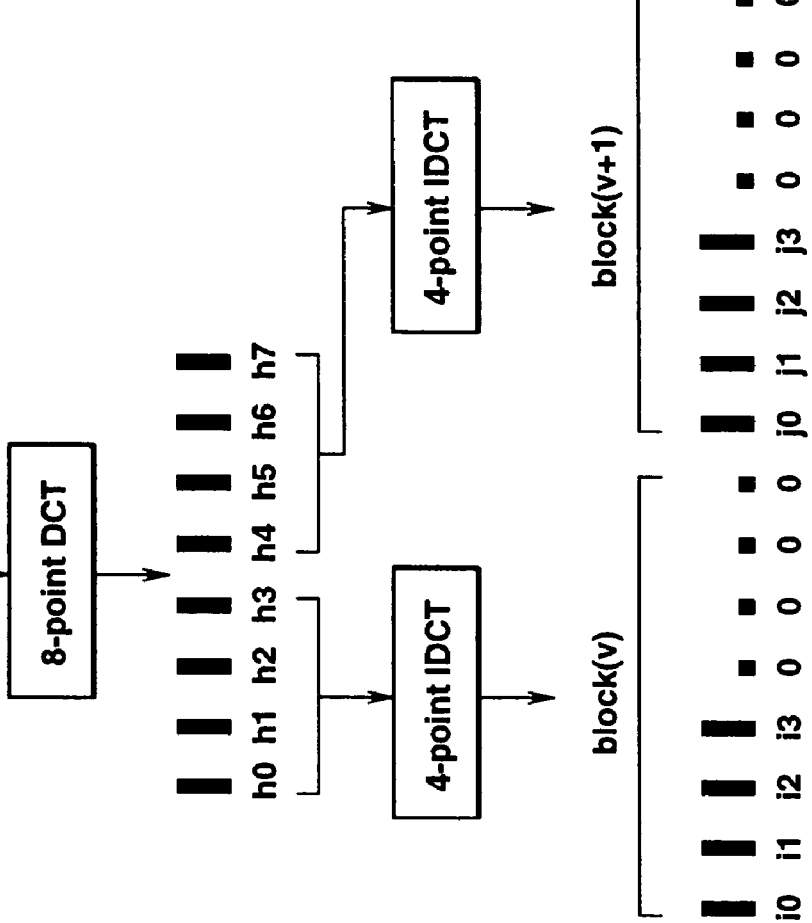
FIG.9A
FIG.9B
FIG.9C

INFORMATION PROCESSING APPARATUS AND METHOD, AND PROGRAM STORAGE MEDIUM

This application is a continuation of U.S. application Ser. No. 09/341,401, filed Aug. 23, 1999 now U.S. Pat. No. 6,963,606, which application is hereby incorporated by reference herein.

TECHNICAL FIELD

This invention relates to conversion processing of digital signals compression-coded by using orthogonal transform such as discrete cosine transform (DCT), and particularly to a digital signal conversion method and a digital signal conversion device for converting the resolution between compressed video signals of different formats.

BACKGROUND ART

Conventionally, discrete cosine transform (DCT), which is a kind of orthogonal transform coding, has been used as a coding system for efficiently compression-coding still picture data and dynamic picture data. In handling such digital signals on which orthogonal transform has been carried out, it is sometimes necessary to change the resolution or transform base.

For example, in the case where a first orthogonally transformed digital signal having a resolution of 720×480 pixels as an example of home digital video format is to be converted to a second orthogonally transformed digital signal having a resolution of 360×240 pixels of a so-called MPEG1 format, inverse orthogonal transform is carried out on the first signal to restore a signal on the spatial domain, and then transform processing such as interpolation and thinning is carried out to perform orthogonal transform again, thus converting the first signal to the second signal.

In this manner, it is often the case that the orthogonally transformed digital signal is inversely transformed once to restore the original signal, then processed by required transform operations, and then orthogonally transformed again.

FIG. 28 shows an exemplary structure of a conventional digital signal processing device for carrying out resolution conversion as described above with respect to digital signals on which DCT has been carried out.

In this conventional digital signal conversion device, a video signal (hereinafter referred to as DV video signal) of a so-called "DV format", which one format of home digital video signals, is inputted as a digital signal of a first format, and a video signal (hereinafter referred to as MPEG video signal) of a format in conformity to the so-called MPEG (Moving Picture Experts Group) standard is outputted as a digital signal of a second format.

A de-framing section 51 is adapted for cancelling framing of the DV video signal. In this de-framing section 51, the DV video signal framed in accordance with the so-called DV format is restored to a variable-length code.

A variable-length decoding (VLD) section 52 carries out variable-length decoding of the video signal restored to the variable-length code by the de-framing section 51. The compressed data in the DV format is compressed at a fixed rate so that its data quantity is reduced to approximately ⅕ of that of the original signal, and is coded by variable-length coding so as to improve the data compression efficiency. The variable-length decoding section 52 carries out decoding corresponding to such variable-length coding.

An inverse quantizing (IQ) section 53 inversely quantizes the video signal decoded by the variable-length decoding section 52.

An inverse weighting (IW) section 54 carries out inverse weighting, which is the reverse operation of weighting carried out on the video signal inversely quantized by the inverse quantizing section 53.

The weighting operation is to reduce the value of DCT coefficient for higher frequency components of the video signal by utilizing such a characteristic that the human visual sense is not very acute to a distortion on the high-frequency side. Thus, the number of high-frequency coefficients having a value of 0 is increased and the variable-length coding efficiency can be improved. As a result, the quantity of arithmetic operation of the DCT transform can be reduced in some cases.

An inverse discrete cosine transform (IDCT) section 55 carries out inverse DCT (inverse discrete cosine transform) of the video signal which is inversely weighted by the inverse weighting section 54, and thus restores the DCT coefficient to data of the spatial domain, that is, pixel data.

Then, a resolution converting section 56 carries out required resolution conversion with respect to the video signal restored to the pixel data by the inverse discrete cosine transform section 55.

A discrete cosine transform (DCT) section 57 carries out discrete cosine transform (DCT) of the video signal which is resolution-converted by the resolution converting section 56, and thus converts the video signal to an orthogonal transform coefficient (DCT coefficient) again.

A weighting (W) section 58 carries out weighting of the video signal which is resolution-converted and converted to the DCT coefficient. This weighting is the same as described above.

A quantizing (Q) section 59 quantizes the video signal weighted by the weighting section 58.

Then, a variable-length coding (VLC) section 60 carries out variable-length coding of the video signal quantized by the quantizing section 59 and outputs the resultant signal as an MPEG video signal.

The above-described "MPEG" is an abbreviation of the Moving Picture Experts Group of ISO/IEC JTC1/SC29 (International Organization for Standardization/International Electrotechnical Commission, Joint Technical Committee 1/Sub Committee 29). There are an ISO11172 standard as the MPEG1 standard and an ISO13818 standard as the MPEG2 standard. Among these international standards, ISO11172-1 and ISO13818-1 are standardized in the multimedia multiplexing section, and ISO11172-2 and ISO13818-2 are standardized in the video section, while ISO11172-3 and ISO13818-3 are standardized in the audio section.

In accordance with ISO11172-2 or ISO13818-2 as the picture compression coding standard, an image signal is compression-coded on the picture (frame or field) basis by using the correlation of pictures in the time or spatial direction, and the use of the correlation in the spatial direction is realized by using DCT coding.

In addition, this orthogonal transform such as DCT is broadly employed for various types of picture information compression coding such as JPEG (Joint Photographic Coding Experts Group).

In general, orthogonal transform enables compression coding with high compression efficiency and excellent reproducibility by converting an original signal of the time domain or spatial domain to an orthogonally transformed domain such as the frequency domain.

The above-described "DV format" is adapted for compressing the data quantity of digital video signals to approximately ⅕ for component recording onto a magnetic tape. The DV format is used for home digital video devices and some of digital video devices for professional use. This DV format realizes efficient compression of video signals by combining discrete cosine transform (DCT) and variable-length coding (VLC).

Meanwhile, a large quantity of calculation is generally required for orthogonal transform such as discrete cosine transform (DCT) and inverse orthogonal transform. Therefore, there arises a problem that resolution conversion of video signals as described above cannot be carried out efficiently. Also, since errors are accumulated by increase in the quantity of calculation, there arises a problem of deterioration in signals.

DISCLOSURE OF THE INVENTION

In view of the foregoing status of the art, it is an object of the present invention to provide a digital signal conversion method and a digital signal conversion device which enable efficient conversion processing such as resolution conversion with less deterioration in signals by reducing the quantity of arithmetic processing of the data quantity of signals which are processed by resolution conversion for conversion to a different format.

In order to solve the foregoing problems, a digital signal conversion method according to the present invention includes: a data extraction step of extracting a part of orthogonal transform coefficients from respective blocks of a digital signal of a first format consisting of orthogonal transform coefficient blocks of a predetermined unit, thus constituting partial blocks; an inverse orthogonal transform step of carrying out inverse orthogonal transform of the orthogonal transform coefficients constituting each partial block, on the partial block basis; a partial block connection step of connecting the partial blocks processed by inverse orthogonal transform, thus constituting a new block of the predetermined unit; and an orthogonal transform step of orthogonally transforming the new block on the block basis, thus generating a second digital signal consisting of the new orthogonal transform block of the predetermined unit.

Also, in order to solve the foregoing problems, a digital signal conversion method according to the present invention includes: an inverse orthogonal transform step of carrying out inverse orthogonal transform of a digital signal of a first format consisting of orthogonal transform coefficient blocks of a predetermined unit, on the block basis; a block division step of dividing each block of the digital signal of the first format processed by inverse orthogonal transform; an orthogonal transform step of orthogonally transforming orthogonal transform coefficients constituting each divided block, on the divided block basis; and a data enlargement step of interpolating each orthogonally transformed block with an orthogonal transform coefficient of a predetermined value to constitute the predetermined unit, thus generating a digital signal of a second format.

Also, in order to solve the foregoing problems, a digital signal conversion device according to the present invention includes: decoding means for decoding a digital signal of a first format consisting of orthogonal transform coefficients of a predetermined unit; inverse quantization means for inversely quantizing the decoded digital signal; resolution conversion means for extracting a part of the orthogonal transform coefficients from adjacent blocks of orthogonal transform coefficient blocks of the predetermined unit of the inversely quantized digital signal, thus constituting partial blocks, and converting the resolution; quantization means for quantizing the digital signal processed by resolution conversion; and coding means for coding the quantized digital signal, thus generating a digital signal of a second format.

Also, in order to solve the foregoing problems, a digital signal conversion device according to the present invention includes: decoding means for decoding a digital signal of a first format compression-coded by using orthogonal transform; inverse quantization means for inversely quantizing the decoded digital signal; resolution conversion means for interpolating each predetermined block of the inversely quantized digital signal with an orthogonal transform coefficient of a predetermined value, thus constituting a predetermined unit, and converting the resolution; quantization means for quantizing the digital signal processed by resolution conversion; and coding means for coding the quantized digital signal, thus generating a digital signal of a second format.

Also, in order to solve the foregoing problems, a digital signal conversion method according to the present invention is adapted for converting a digital signal of a first format consisting of orthogonal transform coefficient blocks of a predetermined unit to a digital signal of a second format consisting of new orthogonal transform coefficient blocks of another predetermined unit. In this method, the data quantity of the digital signal of the second format is controlled by utilizing data quantity information included in the digital signal of the first format.

Also, in order to solve the foregoing problems, a digital signal conversion device according to the present invention is adapted for converting a digital signal of a first format consisting of orthogonal transform coefficient blocks of a predetermined unit to a digital signal of a second format consisting of new orthogonal transform coefficient blocks of another predetermined unit. This device includes: decoding means for decoding the digital signal of the first format; inverse quantization means for inversely quantizing the decoded digital signal; signal conversion means for carrying out signal processing accompanying format conversion of the inversely quantized digital signal; quantization means for quantizing the digital signal processed by signal processing; data quantity control means for controlling the data quantity in the quantization means; and coding means for coding the digital signal which is quantized and has its data quantity controlled by the data quantity control means, thus generating the digital signal of the second format.

Also, in order to solve the foregoing problems, a digital signal conversion method according to the present invention is adapted for converting a digital signal of a first format to a digital signal of a second format. This method includes: a decoding step of decoding the digital signal of the first format; a signal conversion step of converting the decoded digital signal of the first format to the digital signal of the second format; a coding step of coding the digital signal of the second format; and a weighting processing step of collectively carrying out inverse weighting for the digital signal of the first format and weighting for the digital signal of the second format.

Also, in order to solve the foregoing problems, a digital signal conversion device according to the present invention is adapted for converting a digital signal of a first format to a digital signal of a second format. This device includes: decoding means for decoding the digital signal of the first format; signal conversion means for converting the decoded digital signal of the first format to the digital signal of the second format; coding means for coding the digital signal of the second format; and weighting processing means for collectively carrying out inverse weighting for the digital signal of the first format and weighting for the digital signal of the second format.

Also, in order to solve the foregoing problems, according to the present invention, decoding along with motion compensation is carried out on an input information signal compression-coded along with motion detection, and signal conversion processing is carried out on this decoded signal. Then, compression coding processing is carried out on the converted signal along with motion detection based on motion vector information of the input information signal.

Also, in order to solve the foregoing problems, according to the present invention, partial decoding processing is carried out on an input information signal processed by compression coding including predictive coding along with motion detection and orthogonal transform coding, thus obtaining a decoded signal of the orthogonal transform domain. Then, signal conversion processing is carried out on the decoded signal of the orthogonal transform domain, and compression coding processing along with motion compensation prediction is carried out on the converted signal by using motion detection based on motion vector information of the input information signal.

Also, in order to solve the foregoing problems, according to the present invention, partial decoding processing is carried out on an input information signal processed by compression coding including predictive coding along with motion detection and orthogonal transform coding, thus obtaining a signal of the orthogonal transform domain. Then, signal conversion processing is carried out on the signal, and compression coding is carried out on the converted signal by adding motion vector information converted on the basis of motion vector information of the input information signal.

Also, in order to solve the foregoing problems, according to the present invention, a digital signal of a first format to which dynamic mode/static mode information is added in advance is decoded, and signal conversion processing is carried out on the decoded signal. Then, whether or not to carry out inter-frame differential coding for each predetermined block of the converted signal is discriminated in accordance with the dynamic mode/static mode information. Coding is carried out on the converted signal on the basis of the result of discrimination, and a digital signal of a second format processed by coding using the inter-frame difference is outputted.

Also, in order to solve the foregoing problems, according to the present invention, partial decoding processing is carried out on a digital signal of a first format, thus obtaining a signal of the orthogonal transform domain. Signal conversion processing is carried out on the signal of the orthogonal transform domain, and whether or not to carry out inter-frame differential coding for each predetermined block of the converted signal is discriminated in accordance with the maximum value of the absolute value of the inter-frame difference of the converted signal. The converted signal is coded on the basis of the result of discrimination, and a digital signal of a second format is outputted.

Moreover, in order to solve the foregoing problems, according to the present invention, with respect to a digital signal of a first format including an intra-frame coded signal processed by intra-frame coding and a forward predictive coded signal and a bidirectionally predictive coded signal processed by forward and bidirectional inter-frame predictive coding along with motion detection, inverse orthogonal transform is carried out on the intra-frame coded signal and the forward predictive coded signal. A motion compensation output to be added to the partially decoded forward predictive coded signal and bidirectionally predictive coded signal is generated on the basis of the inverse orthogonal transform output. The motion compensation output is orthogonally transformed, and the orthogonal transform output is added to the partially decoded forward predictive coded signal and bidirectionally predictive coded signal. Compression coding is carried out on a signal based on the addition output, and a digital signal of a second format is outputted.

BRIEF DESCRIPTION OF THE DRAWINGS

FIG. 6 illustrates the basic calculation procedure for resolution conversion processing.

FIGS. 7A and 7B illustrate a "static mode" and a "dynamic mode" of the DV format.

FIGS. 9A to 9C are block diagrams showing an exemplary structure of a digital signal conversion device according to a second embodiment of the present invention.

BEST MODE FOR CARRYING OUT THE INVENTION

Preferred embodiments of the present invention will now be described with reference to the drawings.

First, the structure of a digital signal conversion device according to the present invention will be described, and then a digital signal conversion method according to the present invention will be described with reference to the structure.

Figure 1:
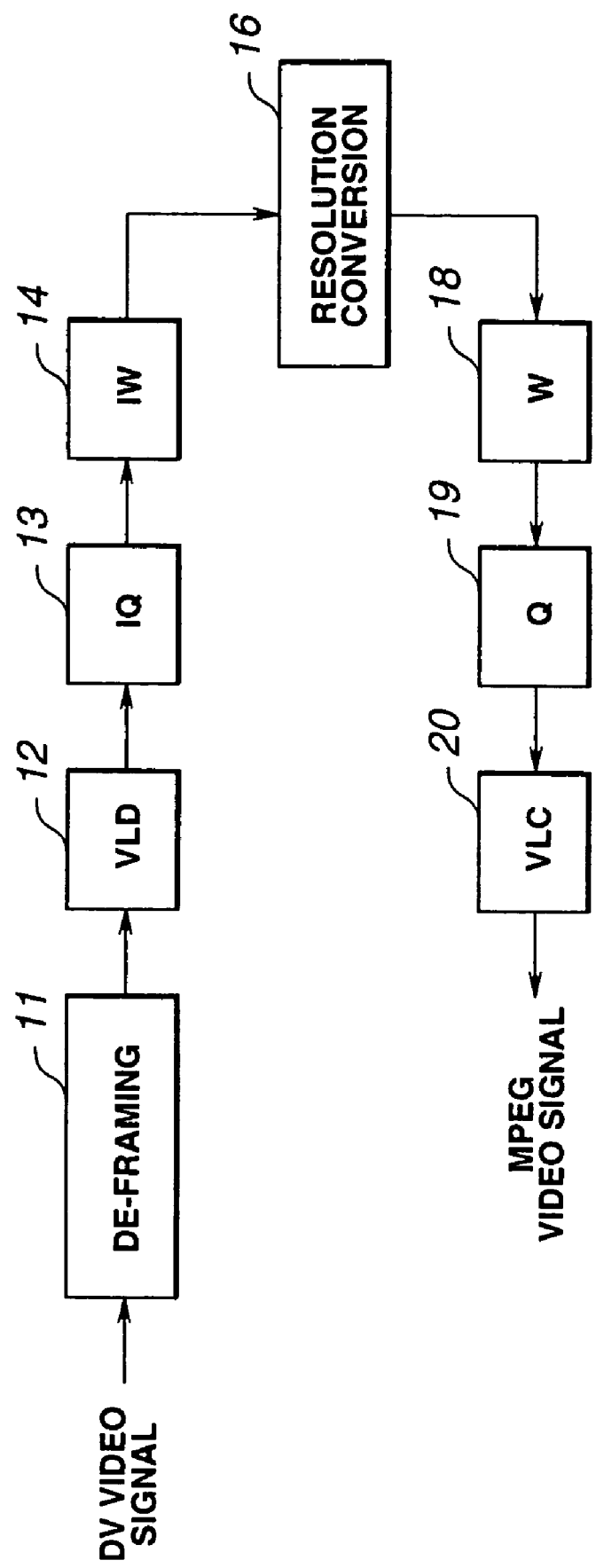
FIG. 1 is a block diagram showing an exemplary structure of a digital signal conversion device according to a first embodiment of the present invention.

FIG. 1 shows an exemplary structure of essential portions of a digital signal conversion device as a first embodiment of the present invention. Although signal conversion is exemplified by resolution conversion, it is a matter of course that signal conversion is not limited to resolution conversion and that various types of signal processing such as format conversion and filter processing can be employed.

In this digital signal conversion device, a video signal (hereinafter referred to as DV video signal) of the above-described so-called "DV format" is inputted as a first digital signal, and a video signal (hereinafter referred to as MPEG video signal) of a format in conformity to the MPEG (Moving Picture Experts Group) standard is outputted as a second digital signal.

A de-framing section 11 is adapted for cancelling framing of the DV video signal. In this de-framing section 11, the DV video signal framed in accordance with the predetermined format (so-called DV format) is restored to a variable-length code.

A variable-length decoding (VLD) section 12 carries out variable-length decoding of the video signal restored to the variable-length code by the de-framing section 11.

An inverse quantizing (IQ) section 13 inversely quantizes the video signal decoded by the variable-length decoding section 12.

An inverse weighting (IW) section 14 carries out inverse weighting, which is the reverse operation of weighting carried out on the video signal inversely quantized by the inverse quantizing section 13.

In the case where resolution conversion is carried out as an example of signal conversion processing, a resolution converting section 16 carries out required resolution conversion in the orthogonal transform domain (frequency domain) with respect to the video signal inversely weighted by the inverse weighting section 14.

A weighting (W) section 18 carries out weighting of the video signal processed by resolution conversion.

A quantizing (Q) section 19 quantizes the video signal weighted by the weighting section 18.

Then, a variable-length coding (VLC) section 20 carries out variable-length coding of the video signal quantized by the quantizing section 19 and outputs the resultant signal as an MPEG video signal.

Figure 28:
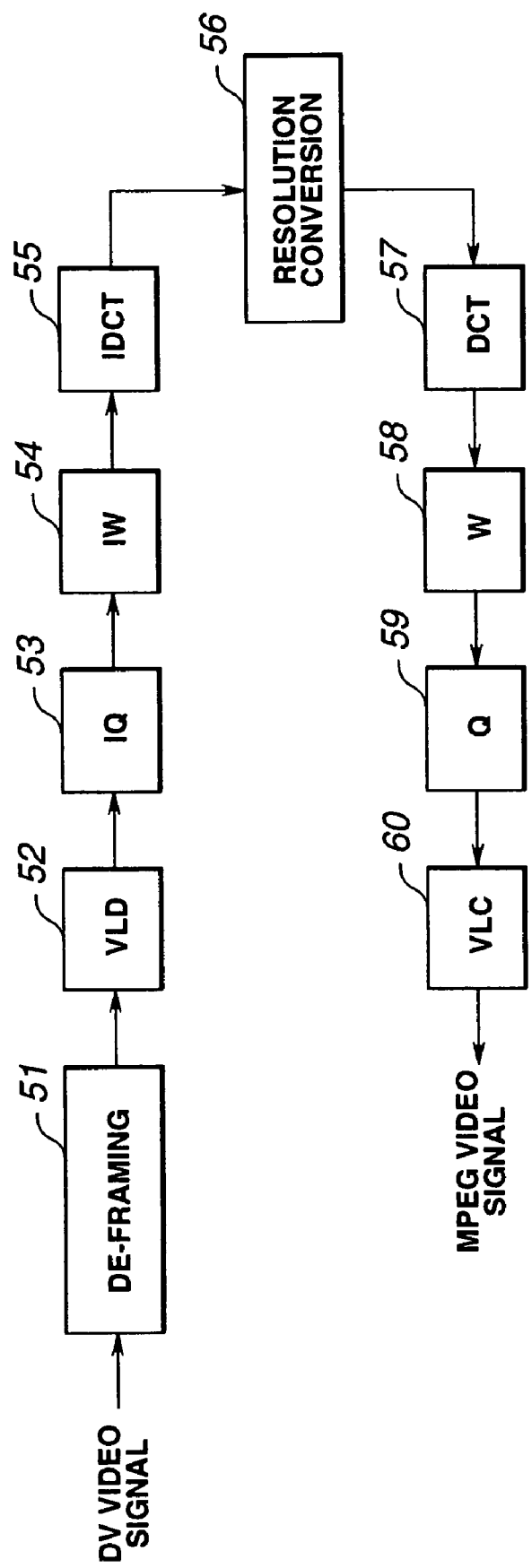
FIG. 28 is a block diagram showing an exemplary structure of a conventional digital signal conversion device.

The structure of each part of the above-described digital signal conversion device according to the present invention shown in FIG. 1 can be made similar to the structure of each part of the conventional digital signal conversion device shown in FIG. 28.

However, this digital signal conversion device according to the present invention differs from the conventional digital signal conversion device in that an inverse discrete cosine transform (IDCT) section and a discrete cosine transform (DCT) section are not provided before and after the resolution converting section 16.

That is, in the conventional digital signal conversion device, the orthogonal transform coefficient of the inputted digital signal of the first format is inversely orthogonally transformed to be restored to data in the spatial domain (on the frequency base), and then required conversion operation is carried out. Therefore, orthogonal transform is carried out again to restore the data to the orthogonal transform coefficient.

On the contrary, in the digital signal conversion device according to the present invention, required conversion operation of the orthogonal transform coefficient of the inputted digital signal of the first format is carried out in the orthogonal transform coefficient domain (frequency domain), and inverse orthogonal transform means and orthogonal transform means are not provided before and after the means for carrying out conversion processing such as resolution conversion.

The principle of resolution conversion processing in the resolution converting section 16 will now be described with reference to FIGS. 2 and 3.

Figure 2:
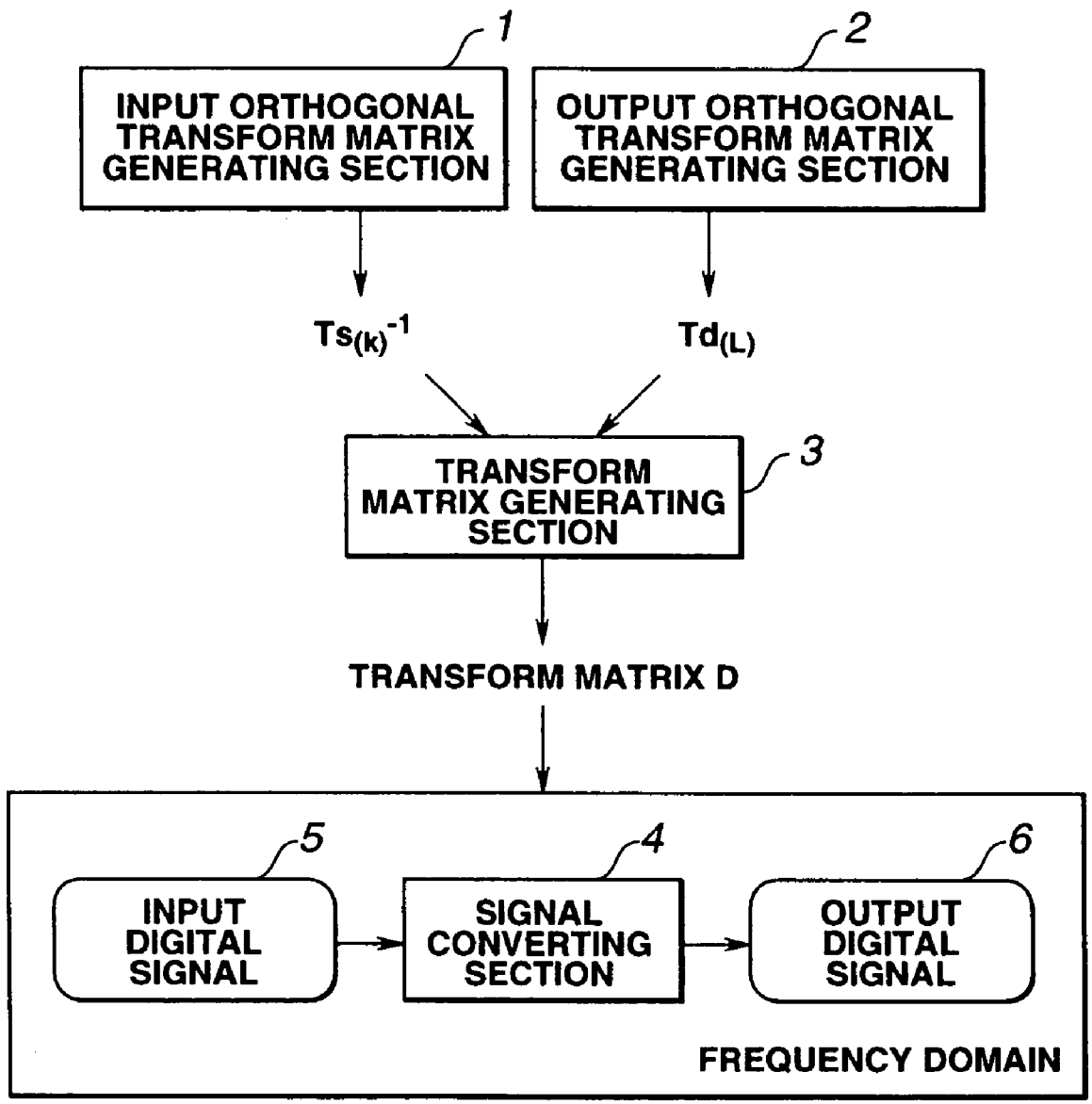
FIG. 2 illustrates the principle of resolution conversion in the orthogonal transform domain.

In FIG. 2, an input orthogonal transform matrix generating section 1 generates an inverse matrix $Ts_{(k)}^{-1}$ of an orthogonal transform matrix $Ts_{(k)}$ expressing orthogonal transform that has been carried out on an input digital signal 5 in advance, and sends the inverse matrix to a transform matrix generating section 3. An output orthogonal transform matrix generating section 2 generates an orthogonal transform matrix $Td_{(L)}$ corresponding to an inverse transform matrix $Td_{(L)}^{-1}$ expressing inverse orthogonal transform that is to be carried out on an output digital signal, and sends the orthogonal transform matrix to the transform matrix generating section 3. The transform matrix generating section 3 generates a transform matrix D for carrying out conversion processing such as resolution conversion in the frequency domain, and sends the transform matrix to a signal converting section 4. The signal converting section 4 converts the input digital signal 5 that has been converted to the frequency domain by orthogonal transform while maintaining the orthogonally transformed domain such as the frequency domain, and generates an output digital signal 6.

Figure 3:
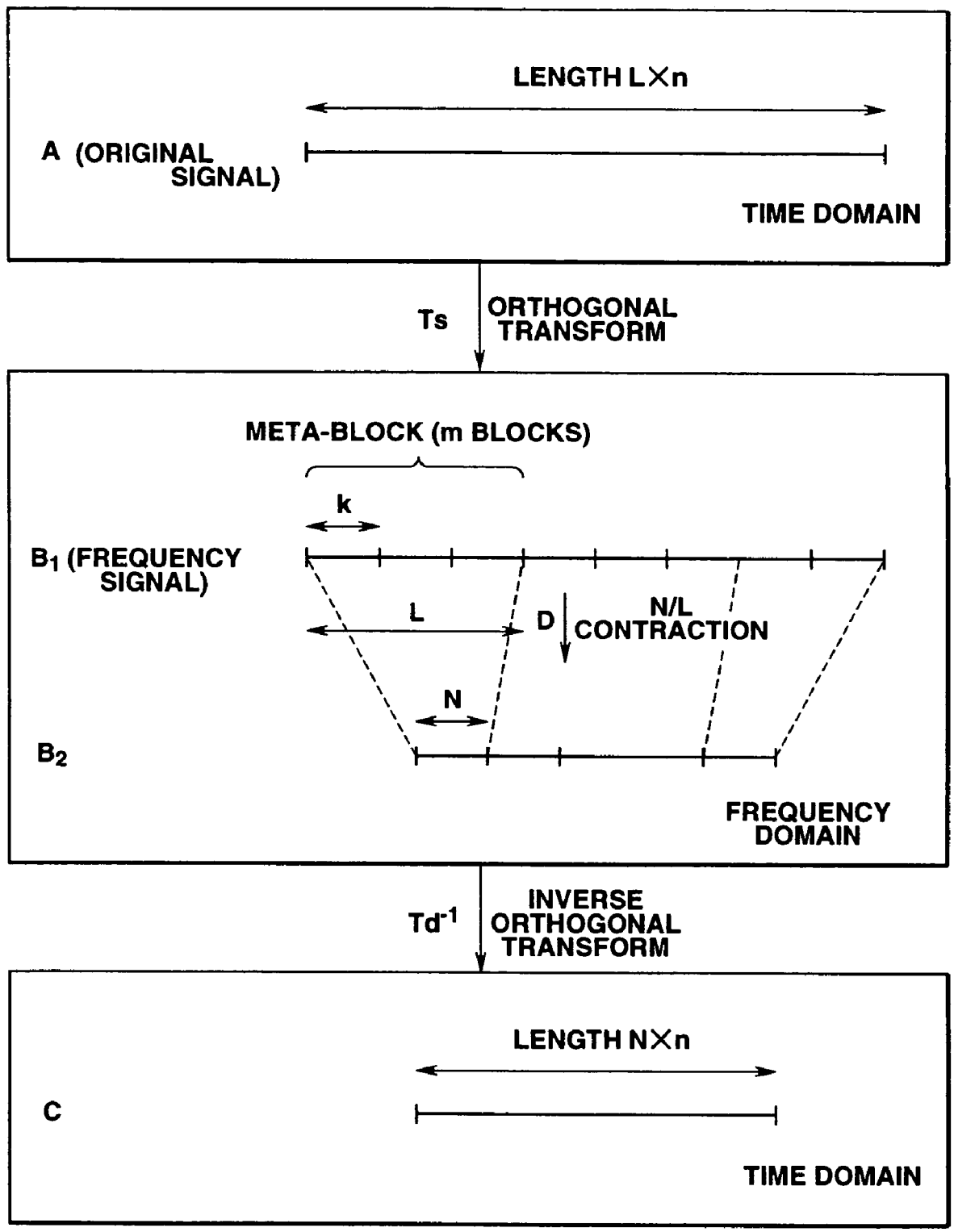
FIG. 3 illustrates the principle of resolution conversion in the orthogonal transform domain.

Specifically, as shown in FIG. 3, a signal (original signal) A of the original time domain (or spatial domain) is converted to the frequency domain by using the orthogonal transform matrix $Ts_{(k)}$ to generate a frequency signal $B_1$ (corresponding to the input digital signal 5). This frequency signal $B_1$ is contracted to N/L (or enlarged) by the signal converting section 4 to generate a frequency signal $B_2$ (corresponding to the output digital signal 6). This frequency signal $B_2$ is inversely orthogonally transformed by using the inverse transform matrix $Td_{(L)}^{-1}$ to generate a signal C of the time domain.

In the example of FIG. 3, the one-dimensional original signal A is orthogonally transformed for each conversion block having a length of k, and m units of adjacent blocks of the resultant conversion blocks of the frequency domain, that is, continuous frequency signals having a length of L (=k×m), are converted to one block having a length of N (where N<L), that is, contracted to N/L as a whole.

In the following description, a matrix (orthogonal transform matrix) in which orthogonal transform base vectors $e_1$, $e_2$, ... $e_n$ having a length of n are arranged in the respective rows is expressed as $T_{(n)}$, and an inverse transform matrix thereof is expressed as $T_{(n)}^{-1}$. In this description, $\underline{x}$ denotes an x vector expression. In this case, each matrix is an n-order forward matrix. For example, a one-dimensional DCT transform matrix $T_{(8)}$ where n=8 holds is expressed by the following equation (1).

tal signal converted by the signal converting section 4, that is, in converting the signal to the time domain. Both these orthogonal transform matrix generating sections 1 and 2 can generate base vectors of arbitrary lengths.

The orthogonal transform matrix generating sections 1 and 2 may be identical orthogonal transform matrix generating sections. In such case, the orthogonal transform matrices $Ts_{(k)}$ and $Td_{(L)}$ become orthogonal transform matrices of the same type, with their base lengths alone differing from each other. The orthogonal transform matrix generating section exists for each of different orthogonal transform systems.

Next, the transform matrix generating section 3 generates an L-order forward matrix A by arranging, on the diagonal, m units of inverse orthogonal transform matrices $Ts_{(k)}^{-1}$ generated by the input orthogonal transform matrix generating section 1, as expressed by the following equation (2). When the base length of the output digital signal 6 is equal to N, the transform matrix generating section 3 takes out N units of low-frequency base vectors of the orthogonal transform matrix $Td_{(L)}$ and generates a matrix B consisting of N rows and L columns.

$$T_{(8)} = \begin{pmatrix} \underline{e_1} \\ \underline{e_2} \\ \underline{e_3} \\ \underline{e_4} \\ \underline{e_5} \\ \underline{e_6} \\ \underline{e_7} \\ \underline{e_8} \end{pmatrix} = \frac{1}{2} \begin{pmatrix} 1\sqrt{2} & 1\sqrt{2} & 1\sqrt{2} & 1\sqrt{2} & 1\sqrt{2} & 1\sqrt{2} & 1\sqrt{2} & 1\sqrt{2} \\ \cos(\pi/16) & \cos(3\pi/16) & \cos(5\pi/16) & \cos(7\pi/16) & \cos(9\pi/16) & \cos(11\pi/16) & \cos(13\pi/16) & \cos(15\pi/16) \\ \cos(2\pi/16) & \cos(6\pi/16) & \cos(10\pi/16) & \cos(14\pi/16) & \cos(18\pi/16) & \cos(22\pi/16) & \cos(26\pi/16) & \cos(30\pi/16) \\ \cos(3\pi/16) & \cos(9\pi/16) & \cos(15\pi/16) & \cos(21\pi/16) & \cos(27\pi/16) & \cos(33\pi/16) & \cos(39\pi/16) & \cos(45\pi/16) \\ \cos(4\pi/16) & \cos(12\pi/16) & \cos(20\pi/16) & \cos(28\pi/16) & \cos(36\pi/16) & \cos(44\pi/16) & \cos(52\pi/16) & \cos(60\pi/16) \\ \cos(5\pi/16) & \cos(15\pi/16) & \cos(25\pi/16) & \cos(35\pi/16) & \cos(45\pi/16) & \cos(55\pi/16) & \cos(65\pi/16) & \cos(75\pi/16) \\ \cos(6\pi/16) & \cos(18\pi/16) & \cos(30\pi/16) & \cos(42\pi/16) & \cos(54\pi/16) & \cos(66\pi/16) & \cos(78\pi/16) & \cos(90\pi/16) \\ \cos(7\pi/16) & \cos(21\pi/16) & \cos(35\pi/16) & \cos(49\pi/16) & \cos(63\pi/16) & \cos(77\pi/16) & \cos(91\pi/16) & \cos(105\pi/16) \end{pmatrix} \quad (1)$$

In FIG. 3, when the size of the orthogonal transform block with respect to the input digital signal 5 that has been orthogonally transformed to the frequency domain by using the orthogonal transform matrix $Ts_{(k)}$ is k, that is, when the base length is equal to k, the input orthogonal transform matrix generating section 1 generates the inverse orthogonal transform matrix $Ts_{(k)}^{-1}$, and the output orthogonal transform matrix generating section 2 generates the orthogonal transform matrix $Td_{(L)}$ having the base length of L (=k×m).

At this point, the inverse orthogonal transform matrix $Ts_{(k)}^{-1}$ generated by the input orthogonal transform matrix generating section 1 corresponds to inverse processing of orthogonal transform processing in generating the input digital signal 5, and the orthogonal transform matrix $Td_{(L)}$ generated by the output orthogonal transform matrix generating section 2 corresponds to inverse processing of inverse orthogonal transform processing in decoding the output digi- $$A = \begin{pmatrix} Ts_{(k)}^{-1} & & & \\ & Ts_{(k)}^{-1} & & 0 \\ & & \ddots & \\ & 0 & & Ts_{(k)}^{-1} \\ & & & & Ts_{(k)}^{-1} \end{pmatrix} \quad (2)$$

$$B = \begin{pmatrix} \underline{e_1} \\ \underline{e_2} \\ \vdots \\ \underline{e_N} \end{pmatrix} = \begin{pmatrix} e_{11} & e_{12} & \cdots & e_{1L-1} & e_{1L} \\ e_{21} & e_{22} & & e_{2L-1} & e_{2L} \\ \vdots & & \ddots & & \vdots \\ e_{N1} & e_{N2} & \cdots & e_{NL-1} & e_{NL} \end{pmatrix} \quad (3)$$

In this expression, however, $e_1, e_2, \ldots, e_N$ are N units of low-frequency base vectors when $Td_{(L)}$ is expressed by base vectors as follows.

$$Td_{(L)} = \begin{pmatrix} e_1 \\ e_2 \\ e_3 \\ \vdots \\ e_L \end{pmatrix} = \begin{pmatrix} e_{11} & e_{12} & \cdots & e_{1L-1} & e_{1L} \\ e_{21} & e_{22} & & e_{2L-1} & e_{2L} \\ e_{31} & e_{32} & & e_{3L-1} & e_{3L} \\ \vdots & & \ddots & & \vdots \\ e_{L1} & e_{L2} & \cdots & e_{LL-1} & e_{LL} \end{pmatrix} \quad (4)$$

Then, an equation of $$D = \alpha \cdot B \cdot A \quad (5)$$

is calculated to generate the matrix D consisting of N rows and L columns. This matrix D is a transform matrix for converting the resolution at the contraction rate (or enlargement rate) of N/L. In this equation, $\alpha$ is a scalar value or vector value and is a coefficient for level correction.

The signal transforming section 4 of FIG. 2 collects m blocks of an input digital signal $B_1$ of the frequency domain into a group, and divides the signal into meta-blocks having a size L (where one meta-block consisting of m blocks), as shown in FIG. 3. If the length of the input digital signal $B_1$ is not a multiple of L, the signal is supplemented and stuffed with dummy data such as 0 to make a multiple of L. The meta-blocks thus generated are expressed by Mi (where i=0, 1, 2, ... ).

The above-described principle of resolution conversion processing is described in detail in PCT/JP98/02653 filed by the present Assignee on 16 Jun. 1998.

A digital signal conversion method of the first embodiment will now be described with reference to the structure of the above-described digital signal conversion device.

Figures 4A, 4B, 4C:
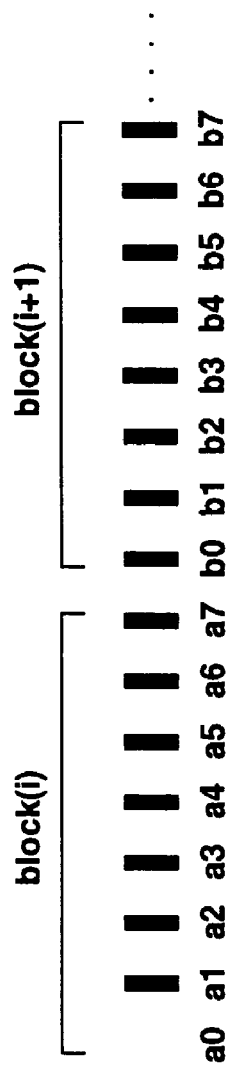
FIGS. 4A to 4C schematically show the state where a DV video signal is converted to an MPEG video signal by digital signal conversion according to the first embodiment of the present invention.

FIGS. 4A to 4C schematically show processing in converting a DV video signal to an MPEG video signal by digital signal conversion of the embodiment of the present invention. This processing is carried out mainly by the resolution converting section 16 in the digital signal processing device of the embodiment of the present invention shown in FIG. 1.

In the following description, a one-dimensional DCT coefficient block is used as an example. However, processing for two-dimensional DCT coefficients is similarly carried out.

First, four DCT coefficients on the low-frequency side are taken out from each of adjacent blocks (i) and (i+1), each consisting of eight DCT coefficients of the digital signal of the first format, as shown in FIG. 4A. That is, from among eight DCT coefficients a0, a1, a2, a3, ... , a7 of the block (i), only the four DCT coefficients a0, a1, a2 and a3 on the low-frequency side are taken out, and a partial block having the number of DCT coefficients reduced to ½ is produced. Similarly, from among eight DCT coefficients b0, b1, b2, b3, ... , b7 of the block (i+1), only the four DCT coefficients b0, b1, b2 and b3 on the low-frequency side are taken out, and a partial block having the number of DCT coefficients reduced to ½ is produced. The operation of taking out the DCT coefficient on the low-frequency side is based on such a characteristic that the energy is concentrated to low frequencies of DC and AC when the video signal is frequency-converted.

Then, 4-point inverse discrete cosine transform (4-point IDCT) is carried out on each partial block consisting of four DCT coefficients, thus obtaining contracted pixel data. These pixel data are expressed as pixel data p0, p1, p2, p3 and pixel data p4, p5, p6, p7 in FIG. 4B.

Next, the partial blocks, each consisting of the contracted pixel data processed by inverse discrete cosine transform, are coupled to generate a block having the same size as the original block. That is, the pixel data p0, p1, p2, p3 and the pixel data p4, p5, p6, p7 are coupled to generate a new block consisting of eight pixel data.

Then, 8-point discrete cosine transform (8-point DCT) is carried out on the new block consisting of eight pixel data, thus generating one block (j) consisting of eight DCT coefficients c0, c1, c2, c3, ... , c7, as shown in FIG. 4C.

Through the procedures as described above, a video signal can be converted to a video signal of a format of different resolution by thinning the number of orthogonal transform coefficients (DCT coefficients) per predetermined block unit to half. When the number of DCT coefficients is to be thinned to ¼, the above-described processing is carried out continuously twice.

The above-described resolution conversion processing can be applied to, for example, conversion from the DV format to the MPEG1 format.

The relation between the DV format and the MPEG format and format conversion between these formats will now be described with reference to FIG. 5.

Figure 5:
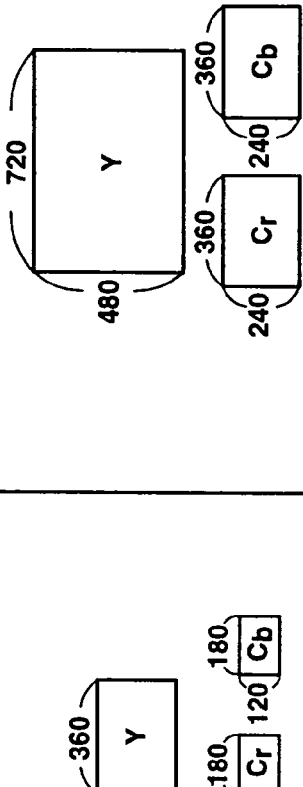
FIG. 5 illustrates the relation between the DV format and the MPEG format.

Specifically, in the case of a video signal in conformity to the NTSC system as shown in FIG. 5, a video signal of the DV format is a compressed video signal having a resolution of 720×480 pixels and a ratio of the sampling frequency of a luminance signal to the sampling frequencies of two color-difference signals equal to 4:1:1. A video signal of the MPEG1 format is a compressed video signal having a resolution of 360×240 pixels and a ratio of the sampling frequency of a luminance signal to the sampling frequencies of two color-difference signals equal to 4:2:0. Therefore, in this case, the number of DCT coefficients in the horizontal and vertical directions of the luminance (Y) signal may be reduced to ½ and the number of DCT coefficients in the vertical direction of the color-difference (C) signal may be reduced to ¼ by the above-described resolution conversion processing according to the present invention.

The ratio of 4:2:0 represents the value of either an odd line or an even line since the odd line and the even line alternately take the values of 4:2:0 and 4:0:2.

On the other hand, in the case of a video signal in conformity to the PAL system, a video signal of the DV format is a compressed video signal having a resolution of 720×576 pixels and a ratio of the sampling frequency of a luminance signal to the sampling frequencies of two color-difference signals equal to 4:2:0. A video signal of the MPEG1 format is a compressed video signal having a resolution of 360×288 pixels and a ratio of the sampling frequency of a luminance signal to the sampling frequencies of two color-difference signals equal to 4:2:0. Therefore, in this case, the number of DCT coefficients in the horizontal and vertical directions of the Y signal may be reduced to ½ and the number of DCT coefficients in the horizontal and vertical directions of the C signal may be reduced to ½ by the above-described resolution conversion processing according to the present invention.

The above-described resolution conversion processing can similarly applied to conversion from the DV format to the MPEG2 format.

In the case of a video signal in conformity to the NTSC system, a video signal of the MPEG2 format is a compressed video signal having a resolution of 720×480 pixels and a ratio of the sampling frequency of a luminance signal to the sampling frequencies of two color-difference signals equal to 4:2:0. Therefore, in this case, the number of DCT coefficients in the vertical direction of the C signal may be reduced to ½ and the number of DCT coefficients in the horizontal direction of the C signal may be doubled, without carrying out conversion processing of the Y signal. The method for this enlargement will be described later.

In the case of a video signal in conformity to the PAL system, a video signal of the MPEG2 format is a compressed video signal having a resolution of 720×576 pixels and a ratio of the sampling frequency of a luminance signal to the sampling frequencies of two color-difference signals equal to 4:2:0. Therefore, in this case, conversion processing need not be carried out with respect to either the Y signal or the C signal.

FIG. 6 shows the basic calculation procedure for the above-described resolution conversion processing.

Specifically, the block consisting of eight DCT coefficients, produced by connecting four DCT coefficients a0, a1, a2, a3 and four DCT-coefficients b0, b1, b2, b3 taken out from the two adjacent blocks of the inputted digital signal of the first format, is multiplied by an (8×8) matrix including two inverse discrete cosine transform matrices (IDCT4) on the diagonal, each being provided as a (4×4) matrix, and having 0 as other components.

The product thereof is further multiplied by a discrete cosine transform matrix (DCT8) provided as an (8×8) matrix, and a new block consisting of eight DCT coefficients c0, c1, c2, c3, . . . , c7 is generated.

In the digital signal conversion method according to the present invention, since resolution conversion processing is carried out in the DCT domain (frequency domain), inverse DCT before resolution conversion and DCT after resolution conversion are not necessary. In addition, by finding the product of the (8×8) matrix including the two (4×4) inverse discrete cosine transform matrices (IDCT4) on the diagonal and the (8×8) discrete cosine transform matrix as a transform matrix D in advance, the quantity of arithmetic operation can be effectively reduced.

The processing for converting the DV video signal as the digital signal of the first format to the MPEG1 video signal as the digital signal of the second format will be described further in detail.

The DV format has a "static mode" and a "dynamic mode" which are switched in accordance with the result of motion detection of pictures. For example, these modes are discriminated by motion detection before DCT of each (8×8) matrix in a video segment, and DCT is carried out in either one mode in accordance with the result of discrimination. Various methods for motion detection may be considered. Specifically, a method of comparing the sum of absolute values of inter-field differences with a predetermined threshold value may be employed.

The "static mode" is a basic mode of the DV format, in which (8×8) DCT is carried out on (8×8) pixels in a block.

The (8×8)-block is constituted by one DC component and 63 AC components.

The "dynamic mode" is used for avoiding such a case that if DCT is carried out when an object is moving, the compression efficiency is lowered by dispersion of energy due to interlace scanning. In this dynamic mode, an (8×8)-block is divided into a (4×8)-block of a first field and a (4×8)-block of a second field, and (4×8) DCT is carried out on the pixel data of each (4×8)-block. Thus, increase in high-frequency components in the vertical direction is restrained and the compression rate can be prevented from being lowered.

Each (4×8)-block as described above is constituted by one DC component and 31 AC components.

Thus, in the DV format, the block structure differs between the static mode and the dynamic mode. Therefore, in order to enable similar processing for the subsequent processing, an (8×8)-block is constituted with respect to the block of the dynamic mode by finding the sum and difference of the coefficients of the same order of each block after DCT of each (4×8)-block. By such processing, the block of the dynamic mode can be regarded as being constituted by one DC component and 63 AC components, similarly to the block of the static mode.

Meanwhile, in converting the video signal of the DV format to the video signal of the MPEG1 format, it is necessary to separate only one field since the MPEG1 format only handles a video signal of 30 frames/sec and has no concept of field.

FIG. 7A schematically shows processing for separating fields in converting DCT coefficients in accordance with the "dynamic mode (2×4×8 DCT mode)" of the DV format to DCT coefficients of the MPEG1 format.

An upper-half (4×8)-block 31a of a DCT coefficient block 31 of (8×8) is the sum (A+B) of coefficients of a first field and coefficients of a second field, and a lower-half (4×8)-block 31b of the DCT coefficient block 31 of (8×8) is the difference (A−B) of the coefficients of the two fields.

Therefore, by adding the upper-half (4×8)-block 31a and the lower-half (4×8)-block 31b of the DCT coefficient block 31 of (8×8) and then dividing the sum by 2, a (4×8)-block 35a consisting of the DCT coefficients of the first field (A) can be obtained. Similarly, by subtracting the lower-half (4×8)-block 31b from the (4×8)-block 31a and then dividing the difference by 2, a (4×8)-block 35b consisting of the discrete cosine coefficients of the second field (B) can be obtained. That is, by this processing, an (8×8)-block 35 having the separated fields can be obtained.

Then, the above-described resolution conversion processing is carried out on the DCT coefficients of one of these fields, for example, the first field.

FIG. 7B schematically shows the processing for separating fields in the "static mode (8×8 DCT mode)".

In a DCT coefficient block 32 of (8×8), DCT coefficients of a first field (A) and DCT coefficients of a second field (B) are mixed. Thus, it is necessary to carry out conversion processing for obtaining a (4×8)-block 35a consisting of the first field (A) and a (4×8)-block 35b consisting of the second field (B) similarly through subtraction between the (4×8)-block 31a and the (4×8)-block 31b, by using field separation processing which will be described hereinafter.

Figure 8:
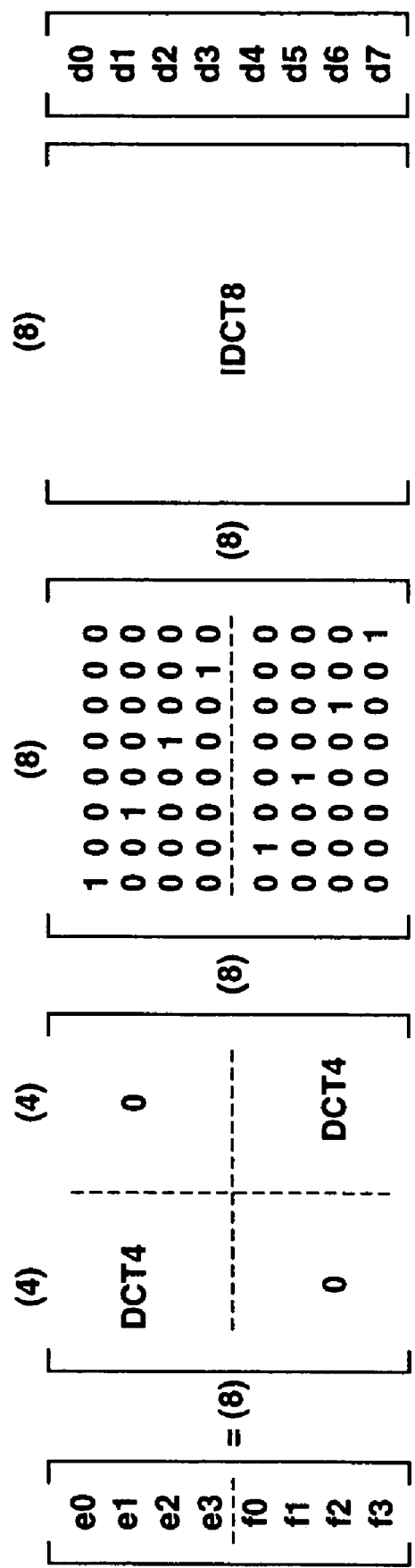
FIG. 8 illustrates the procedure of conversion processing in the "static mode".

FIG. 8 shows the procedure of field separation processing in the "static mode".

First, an input consisting of eight DCT coefficients d0, d1, d2, d3, . . . , d7 is multiplied by an 8th-order inverse discrete cosine transform matrix (IDCT8), thus restoring pixel data.

Next, the data is multiplied by an (8×8) matrix for field separation, thus dividing the (8×8)-block into a first field on the upper side and a second field on the lower side, each being a (4×8)-block.

Then, the data is further multiplied by an (8×8)-block including two discrete cosine transform matrices (DCT4) on the diagonal, each being provided as a (4×4)-matrix.

Thus, eight DCT coefficients consisting of four DCT coefficient e0, e1, e2, e3 of the first field and four DCT coefficients f0, f1, f2, f3 of the second field are obtained.

Then, the above-described resolution conversion processing is carried out on the DCT coefficients of one of these fields, for example, the first field.

In the digital signal conversion method according to the present invention, since resolution conversion is carried out in the DCT domain (frequency domain), inverse DCT before resolution conversion and DCT after resolution conversion are not necessary. In addition, by finding the product of the (8×8) matrix including the two (4×4) inverse discrete cosine transform matrices (IDCT4) on the diagonal and the (8×8) discrete cosine transform matrix in advance, the quantity of calculation can be effectively reduced.

The above-described resolution conversion is for contracting an image. Hereinafter, resolution conversion processing for enlarging an image will be described as a second embodiment.

FIGS. 9A to 9C schematically show the state where a DV video signal is converted to an MPEG2 video signal by the digital signal conversion method according to the present invention.

Also in the following description, one-dimensional DCT coefficients are used. However, similar processing can be carried out on two-dimensional DCT coefficients.

First, 8-point inverse discrete cosine transform (8-point IDCT) is carried out on a block (u) consisting of eight orthogonal coefficients (DCT coefficients g0 to g7) shown in FIG. 9A, thus restoring eight pixel data (h0 to h7).

Next, the block consisting of eight pixel data is divided into two parts, thus generating two partial blocks each consisting of four pixel data.

Then, 4-point DCT is carried out on the two partial blocks each consisting of four DCT coefficients, thus generating two partial blocks (i0 to i3 and j0 to j3) each consisting of four DCT coefficients.

Then, as shown in FIG. 9C, the high-frequency side of each of the two partial blocks, each consisting of four pixel data, is stuffed with 0 as four DCT coefficients. Thus, a block (v) and a block (v+1) each consisting of eight DCT coefficients are generated.

In accordance with the above-described procedure, resolution conversion between compressed video signals of different formats is carried out in the orthogonal transform domain.

Figure 10:
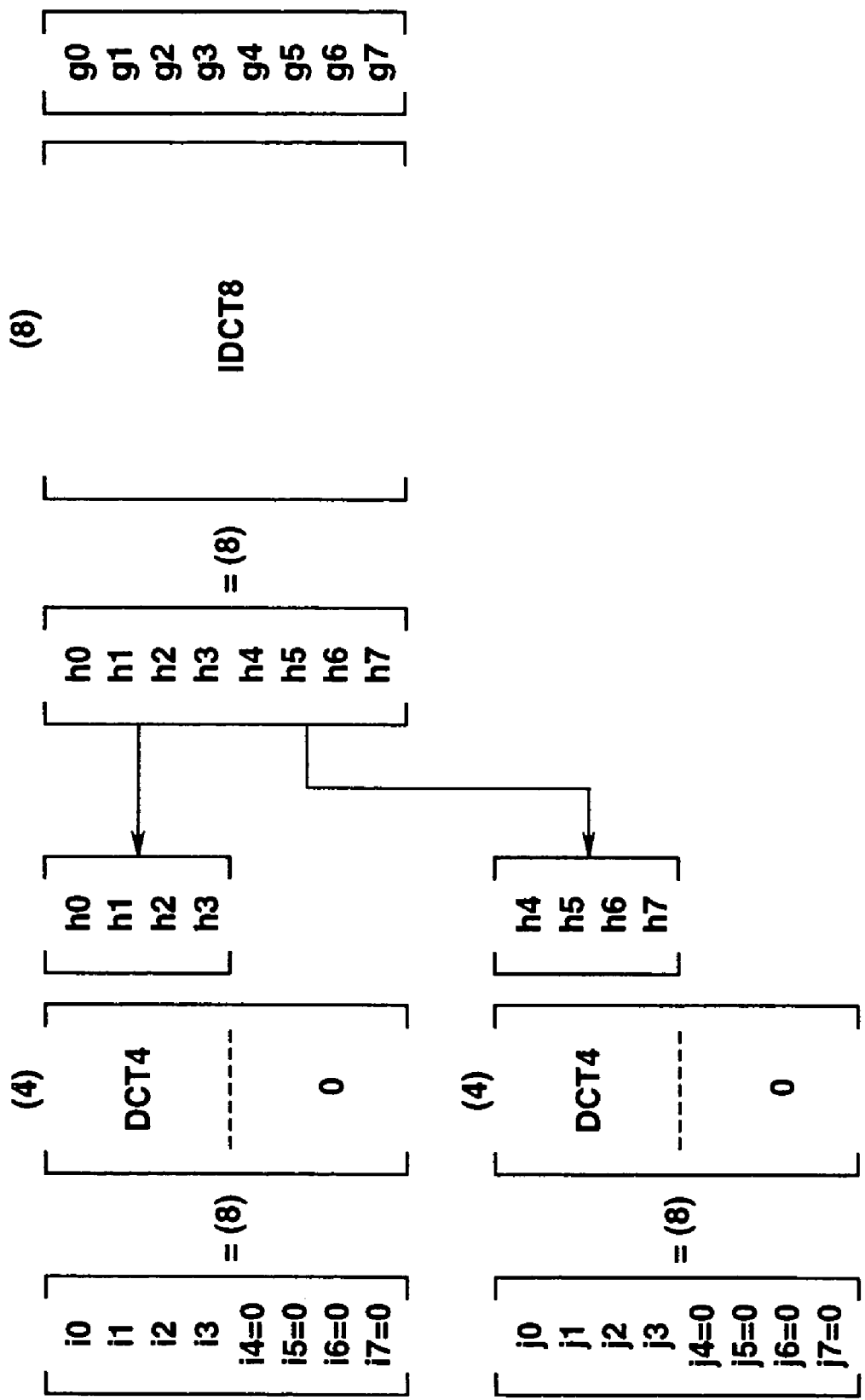
FIG. 10 illustrates the procedure of conversion processing in enlargement of an image.

FIG. 10 shows the procedure of conversion processing in this case.

First, an input consisting of eight DCT coefficients g0, g1, g2, g3, . . . , g7 is multiplied by an 8th-order inverse discrete cosine transform (IDCT) matrix, thus restoring eight pixel data.

Next, the block consisting of eight pixel data is divided into two parts, thus generating two partial blocks each consisting of four pixel data.

Then, each of the two partial blocks, each consisting of four DCT coefficients, is multiplied by a (4×8)-matrix including a 4-point discrete cosine transform matrix provided as a (4×4)-matrix on the upper side and a 0-matrix provided as a (4×4) matrix on the lower side. Thus, two partial blocks (i0 to i7 and j0 to j7) including eight DCT coefficients are generated.

By such processing, two blocks of DCT coefficients are obtained from one block. Therefore, the resolution can be enlarged in the frequency domain.

In the case of the NTSC system, in order to convert the DV format to the MPEG2 format, it is not necessary to carry out horizontal and vertical conversion of the luminance signal Y, but it is necessary to enlarge the color-difference signal C to a double in the horizontal direction and contract the color-difference signal C to ½ in the vertical direction, as shown in FIG. 5. Therefore, the above-described enlargement processing is used for resolution conversion of the color-difference signal C in the horizontal direction in converting the DV format to the MPEG2 format.

Figure 11:
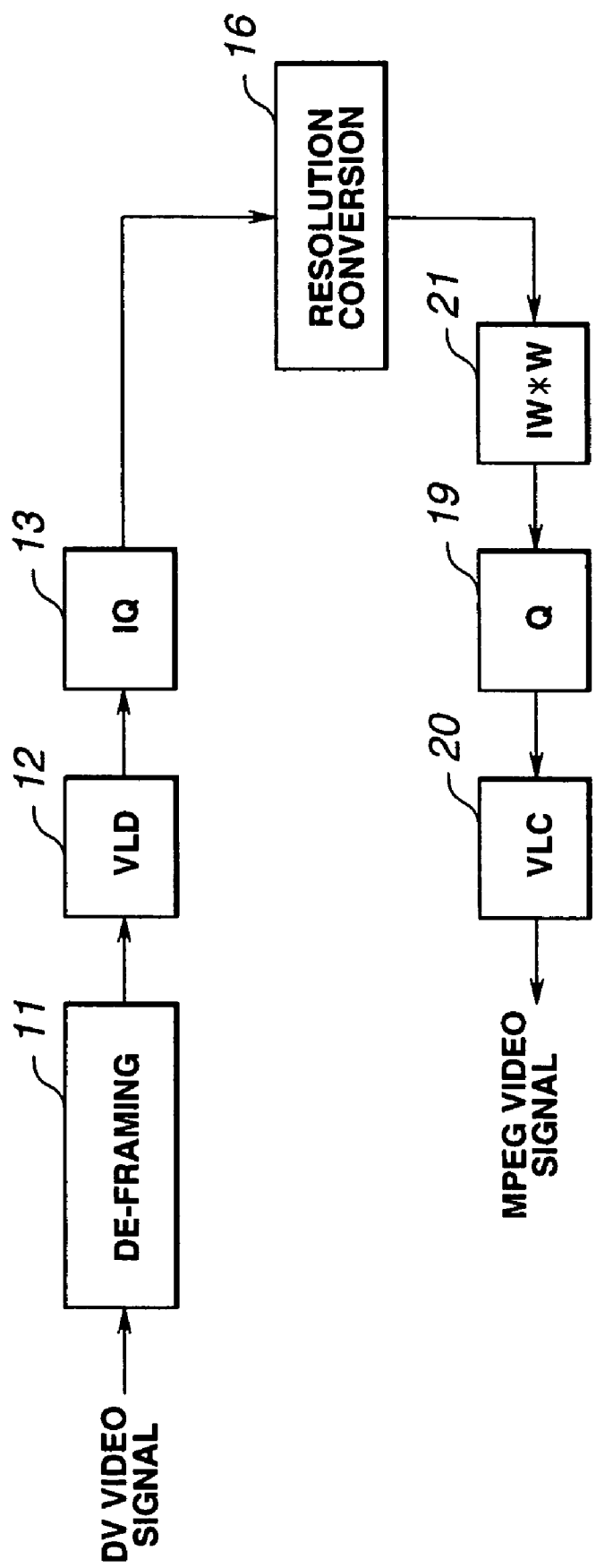
FIG. 11 is a block diagram showing an exemplary structure of a digital signal conversion device according to a third embodiment of the present invention.

FIG. 11 shows an exemplary structure of essential portions of a digital signal conversion device according to a third embodiment of the present invention. The same parts of the structure as those of the first embodiment are denoted by the same reference numerals. The difference from the structure of FIG. 1 is that the weighting section 18 and the inverse weighting section 14 are collectively provided as a weighting processing section 21.

Specifically, the weighting processing (IW*W) section 21 collectively carries out inverse weighting, which is reverse operation of weighting performed on a DV video signal as an inputted digital signal of a first format, and weighting for an MPEG video signal as an outputted digital signal of a second format.

With such a structure, since inverse weighting processing for the inputted video signal of the first format and weighting processing for the outputted video signal of the second format can be collectively carried out, the quantity of calculation can be reduced in comparison with the case where inverse weighting processing and weighting processing are separately carried out.

In the digital signal conversion device of the third embodiment shown in FIG. 11, the weighting processing section 21 is provided on the subsequent stage to the resolution converting section 16. However, the weighting processing section may be provided on the stage preceding the resolution converting section 16.

Figure 12:
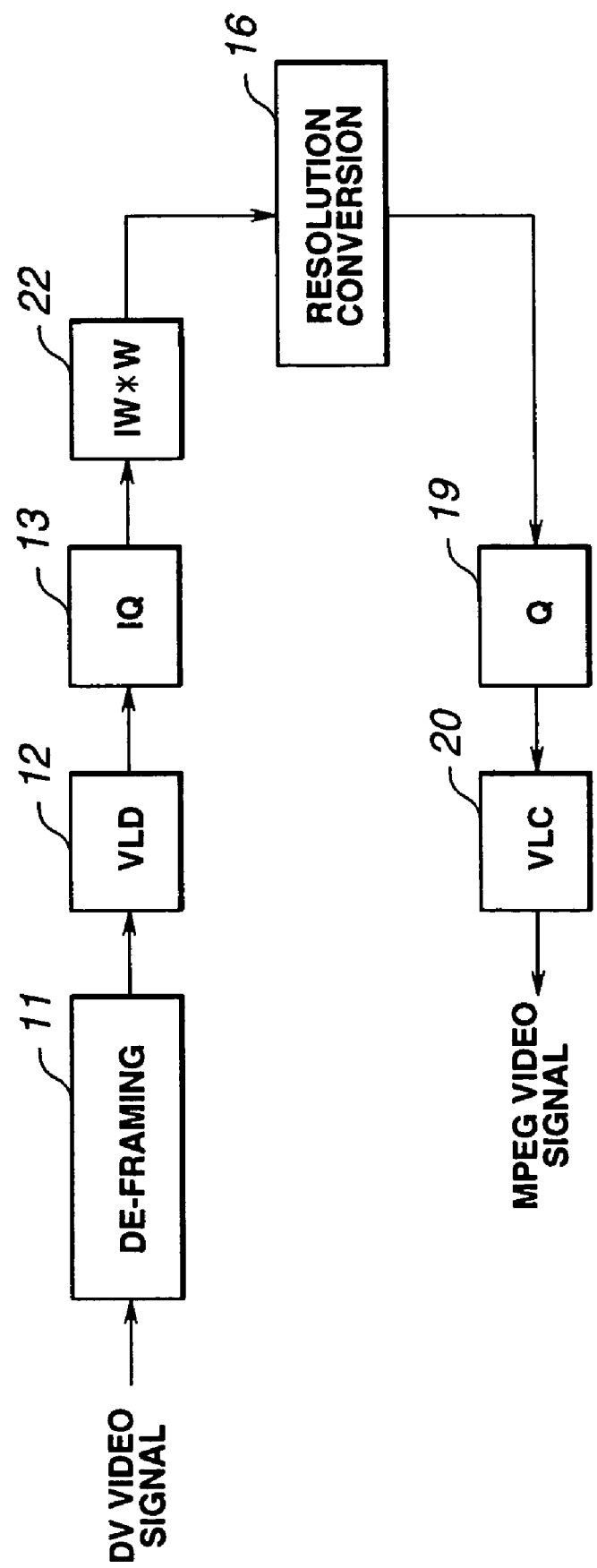
FIG. 12 is a block diagram showing an exemplary structure of a digital signal conversion device according to a fourth embodiment of the present invention.

FIG. 12 shows a digital signal conversion device according to a fourth embodiment of the present invention, in which a weighting processing section 22 is provided on the stage preceding the resolution converting section 16. The parts of the structure of this digital signal conversion device shown in FIG. 12 can be made similar to the respective parts of the digital signal conversion device of FIG. 11.

The weighting processing for collectively carrying out inverse weighting of the digital signal of the first format and weighting of the second digital signal and the above-described weighting processing can be carried out before or after orthogonal transform such as discrete cosine transform (DCT). This is because arithmetic operations therefor are linear operations.

A digital signal conversion method and device according to a fifth embodiment of the present invention will now be described with reference to FIG. 13.

Figure 13:
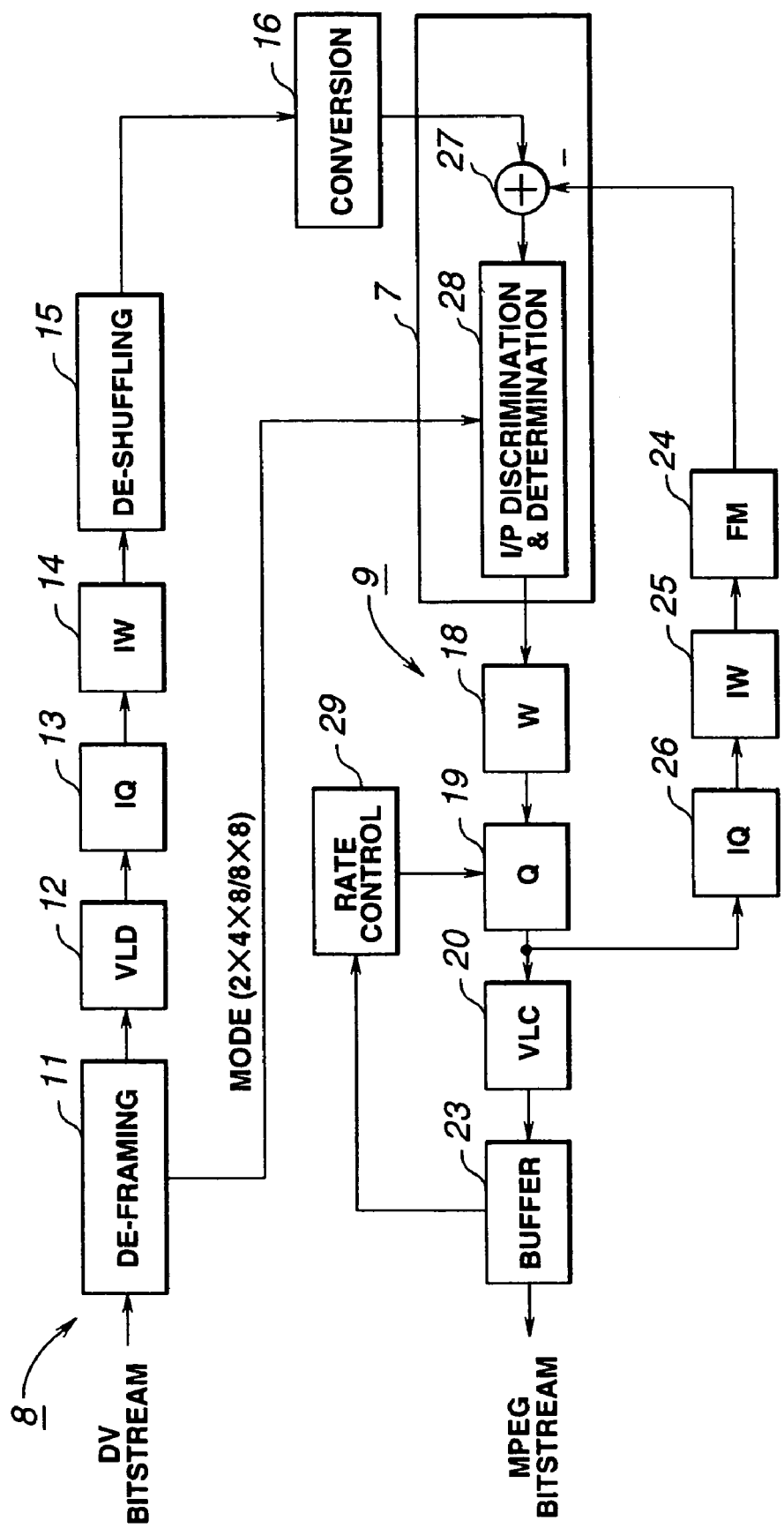
FIG. 13 is a block diagram showing an exemplary structure of a digital signal conversion device according to a fifth embodiment of the present invention.

This digital video signal conversion device has a decoding section 8 for decoding the DV video signal, a resolution converting section 16 for carrying out resolution conversion processing for format conversion of the decoding output from the decoding section 8, a discriminating section 7 for discriminating whether or not to carry out forward inter-frame differential coding for each predetermined block unit of the conversion output from the resolution converting section 16 in accordance with the dynamic mode/static mode information, and a coding section 9 for coding the conversion output from the resolution converting section 16 on the basis of the result of discrimination from the discriminating section 7 and outputting the MPEG video signal, as shown in FIG. 13.

In the following description, the digital video signal conversion device constituted by these parts is employed. As a matter of course, the respective parts carry out processing of each step of the digital signal conversion method according to the present invention.

In the DV video signal inputted to this digital video signal conversion device, a mode flag (for example, one bit) as information indicating the static mode/dynamic mode is added to each DCT block in advance.

In this digital video signal conversion device, the discriminating section 7 discriminates whether or not to carry out forward inter-frame differential coding for each predetermined block unit of the conversion output from the resolution converting section 16 on the basis of the mode flag. This operation will be later described in detail.

A de-framing section 11 extracts the mode flag indicating the static mode/dynamic mode and supplies the mode flag to the discriminating section 7.

A de-shuffling section 15 cancels shuffling which is carried out to uniform the information quantity in a video segment as a unit for length fixation on the DV coding side.

The discriminating section 7 includes an adder 27 and an I (I-picture)/P (P-picture) discriminating and determining section 28. The adder 27 adds to the resolution conversion output a reference DCT coefficient as a negative DCT coefficient stored in a frame memory (FM) section 24 as will be later described. The I/P discriminating and determining section 28 to which the addition output from the adder 27 is supplied is also supplied with the mode flag indicating the static mode/dynamic mode from the de-framing section 11.

The operation of the I/P discriminating and determining section 28 will now be described in detail. The conversion output from the resolution converting section 16 has 8×8 DCT coefficients as a unit. Four DCT coefficient blocks each having 8×8 DCT coefficients are allocated to the luminance signal, and two DCT coefficient blocks are allocated to the color-difference signal, thus constituting one predetermined block from six DCT coefficient blocks in total. This predetermined block is referred to as a macroblock.

Meanwhile, a P-picture assumes that the difference from the previous frame is simply taken. In the case of a still image, the information quantity is reduced as the difference is taken. However, in the case of a dynamic image, the information quantity is increased as the difference is taken. Therefore, if it is discriminated that the image is dynamic from the mode flag indicating the static mode/dynamic mode, the macroblock is left as an I-picture so as not to increase the information quantity. If it is discriminated that the image is static, efficient coding can be carried out by taking the difference to make a P-picture.

The I/P discriminating and determining section 28 uses an I-picture for the macroblock when all the mode flags sent from the de-framing section with respect to the six DCT coefficient blocks indicate the dynamic mode. On the other hand, when the flag indicating the dynamic mode can be detected only in one of the six DCT coefficient blocks, the I/P discriminating and determining section 28 uses a P-picture for the macroblock.

If the flag of the dynamic mode is added to four or more DCT coefficient blocks of the six DCT coefficient blocks, an I-picture may be used for the macroblock. Also, when the flag indicating the static mode is added to all the six DCT coefficient blocks, a P-picture may be used for the macroblock.

The DCT coefficients on the macroblock basis determined as an I/P-picture by the I/P discriminating and determining section 28 are supplied to the coding section 9.

The coding section 9 has a weighting (W) section 18, a quantizing (Q) section 19, an inverse quantizing (IQ) section 26, an inverse weighting (IW) section 25, a FM section 24, a variable-length coding (VLC) section 20, a buffer memory 23, and a rate control section 29.

The weighting (W) section 18 carries out weighting on the DCT coefficient as the conversion output supplied from the converting section 16 through the discriminating section 7.

The quantizing (Q) section 19 quantizes the DCT coefficient weighted by the weighting (W) section 18. Then, the variable-length coding (VLC) section 20 carries out variable-length coding of the DCT coefficient quantized by the quantizing section 19 and supplies MPEG coded data to the buffer memory 23.

The buffer memory 23 fixes the transfer rate of the MPEG coded data and outputs the MPEG coded data as a bit stream. The rate control section 29 controls increase and decrease in the quantity of generated information of the quantizing (Q) section 19, that is, the quantization step, in accordance with change information such as increase and decrease in the buffer capacity of the buffer memory 23.

The inverse quantizing (IQ) section 26 inversely quantizes the quantized DCT coefficient from the quantizing (Q) section 19 and supplies the inversely quantized DCT coefficient to the inverse weighting (IW) section 25. The inverse weighting (IW) section 25 carries out inverse weighting, which is reverse operation of weighting, on the DCT coefficient from the inverse quantizing (IQ) section 26. The DCT coefficient processed by inverse weighting by the inverse weighting (IW) section 25 is stored in the FM section 24 as a reference DCT coefficient.

As described above, in the digital video signal conversion device shown in FIG. 13, the discriminating section 7 discriminates an I-picture or a P-picture for each macroblock by using the I/P discriminating and determining section 28 in accordance with the mode flag indicating the dynamic mode/static mode sent from the de-framing section 11. Therefore, the DV signal originally consisting of an I-picture alone can be converted to an MPEG picture using an I-picture or a P-picture, and such an advantage as improvement in the compression rate as a feature of the MPEG video signal can be utilized.

A digital signal conversion method and device according to a sixth embodiment of the present invention will now be described.

Figure 14:
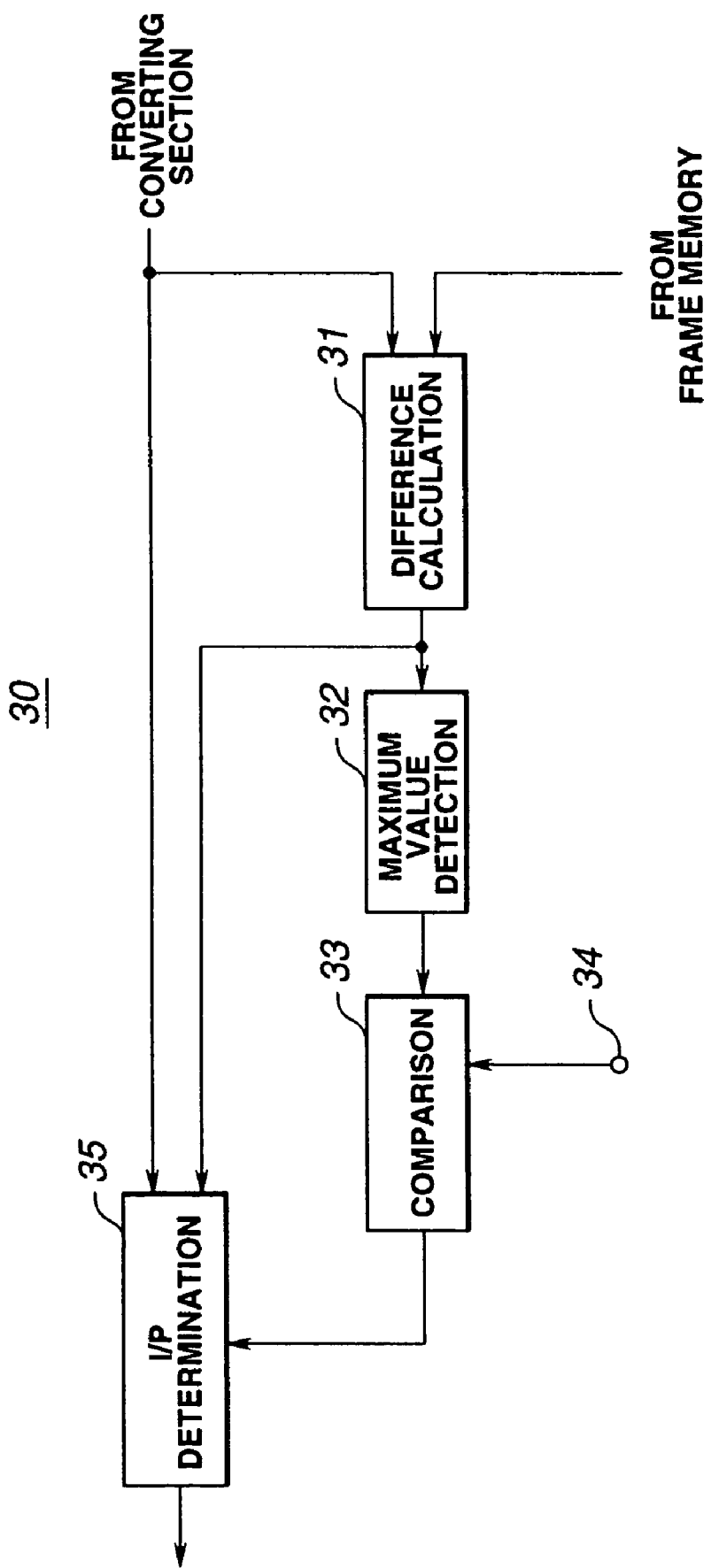
FIG. 14 is a block diagram showing an exemplary structure of a digital signal conversion device according to a sixth embodiment of the present invention.

The digital video signal conversion device according to the sixth embodiment is a digital video signal conversion device in which the discriminating section 7 shown in FIG. 13 is replaced by a discriminating section 30 shown in FIG. 14.

Specifically, the digital video signal conversion device has a decoding section 8 for carrying out partial decoding processing on the DV signal and obtaining a signal of the orthogonal transform domain such as a DCT coefficient, a converting section 16 for carrying out signal conversion processing for format conversion with respect to the DCT coefficient from the decoding section 8, a discriminating section 30 for discriminating whether or not to carry out forward inter-frame differential coding for each predetermined block unit of the conversion output from the converting section 16 in accordance with the maximum value of the absolute value of the inter-frame difference of the conversion output, and a coding section 9 for coding the conversion output from the converting section 16 on the basis of the result of discrimination from the discriminating section 30 and outputting the MPEG video signal.

The discriminating section 30 refers to the maximum value of the absolute value of an AC coefficient at the time when the difference between the converted DCT coefficient as the conversion output from the converting section 16 and a reference DCT coefficient from a FM section 24 is taken, and compares this maximum value with a predetermined threshold value. The discriminating section 30 allocates an I/P-picture to each macroblock on the basis of the result of comparison.

The discriminating section 30 has a difference calculating section 31, a maximum value detecting section 32, a comparing section 33, and an I/P determining section 35.

The difference calculating section 31 calculates the difference between the converted DCT coefficient from the converting section 16 and the reference DCT coefficient from the FM section 24. The differential output from the difference calculating section 31 is supplied to the maximum value detecting section 32 and is also supplied to the I/P determining section 35.

The maximum value detecting section 32 detects the maximum value of the absolute value of the AC coefficient of the differential output. Basically, when a large quantity of information is converted to DCT coefficients, the AC coefficient becomes large. On the other hand, when a small quantity of information is converted to DCT coefficients, the AC coefficient becomes small.

The comparing section 33 compares the maximum value of the absolute value from the maximum value detecting section 32 with a predetermined threshold value supplied from a terminal 34. As this predetermined threshold value is appropriately selected, the quantity of information converted to the DCT coefficients can be discriminated in accordance with the maximum value of the absolute value of the AC coefficient.

The I/P determining section 35 discriminates whether the difference of the DCT coefficients from the difference calculating section 31, that is, the difference in the information quantity, is large or small by using the result of comparison from the comparing section 33. When it is discriminated that the difference is large, the I/P determining section 35 allocates an I-picture to a macroblock consisting of the converted DCT coefficient block from the converting section 16. When it is discriminated that the difference is small, the I/P determining section 35 allocates a P-picture to a macroblock from the difference calculating section 31.

That is, if the absolute value of the maximum value is greater than the threshold value, it is discriminated that the information quantity of the difference is large and an I-picture is employed as the macroblock. On the other hand, if the absolute value of the maximum value is smaller than the threshold value, it is discriminated that the information quantity of the difference is small and a P-picture is employed as the macroblock.

Thus, the digital video signal conversion device according to the sixth embodiment is capable of converting a DV signal originally consisting of an I-picture to an MPEG picture using an I-picture or a P-picture, and can utilize the advantage of improvement in the compression rate as a feature of MPEG signal video signals.

In the digital video signal conversion device shown in FIGS. 13 and 14, a DV signal and an MPEG1 video signal in conformity to the NTSC system are used as the input and output, respectively. However, this digital video signal conversion device can also be applied to each signal of the PAL system.

The above-described resolution conversion processing can be similarly applied to conversion from the DV format to the MPEG2 format.

As the resolution conversion processing carried out by the converting section 16, resolution conversion for contraction is mainly described above. However, enlargement is also possible. Specifically, in general, the resolution can be enlarged at an arbitrary magnification by adding a high-frequency component to an input digital signal of the frequency domain.

When an MPEG2 video signal is applied to a digital broadcasting service, the signal is classified in accordance with the profile (function)/level (resolution). Enlargement of the resolution can be applied to, for example, the case where a video signal of the main profile/high level (MP@HL) used for a digital HDTV in the United States is converted to the DV signal.

The processing of the sixth embodiment may also be carried out by software means.

A digital signal conversion method and device according to a seventh embodiment of the present invention will now be described with reference to FIG. 15. The same parts of the structure as those of the above-described embodiment are denoted by the same reference numerals.

A rate control section 40 controls the data quantity in a quantizing section 19 on the basis of a quantizer number (Q_NO) and a class number (Class) from a de-framing section 11.

Figure 16:
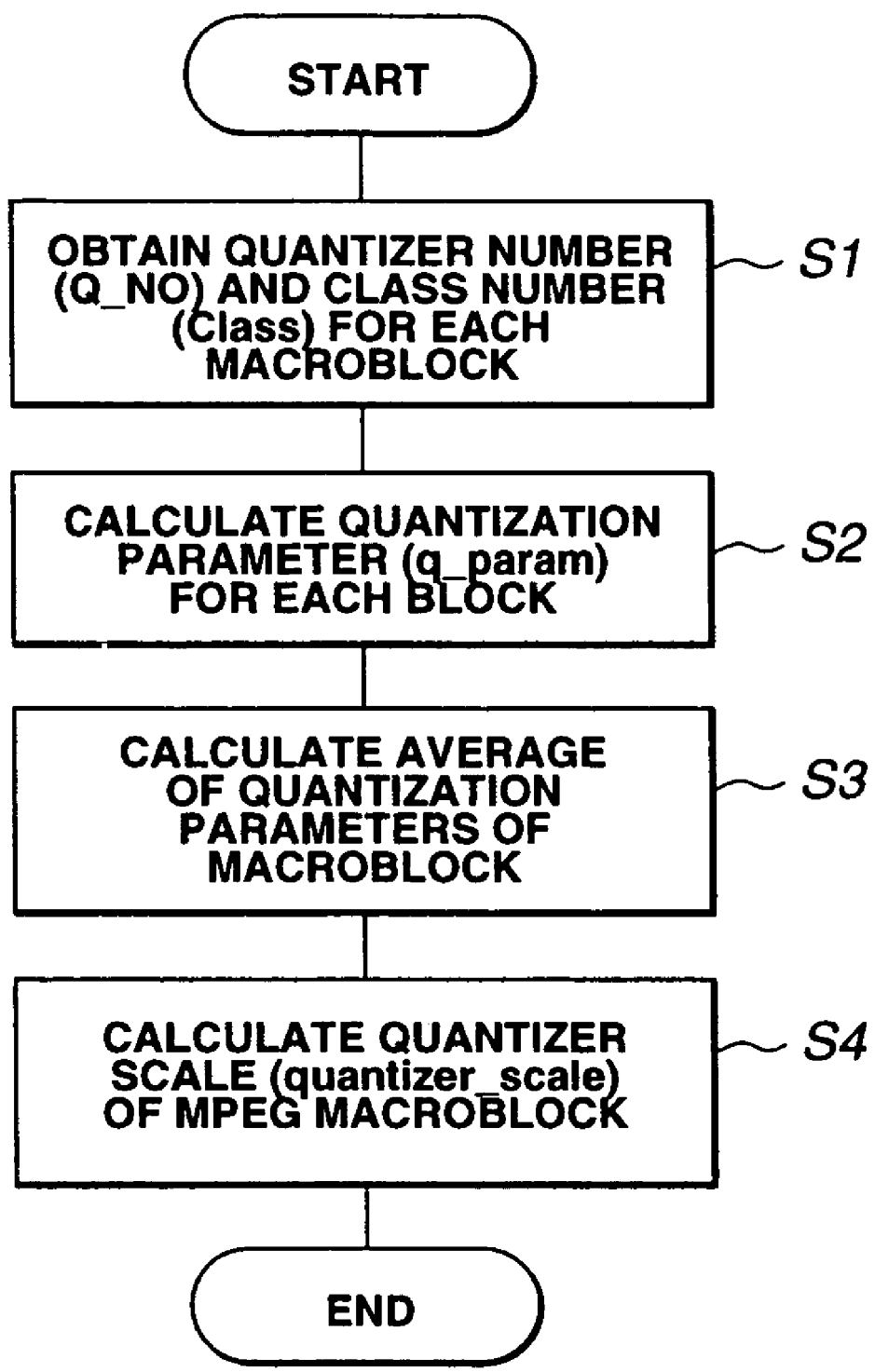
FIG. 16 is a flowchart showing the basic procedure for setting the quantizer scale for each macroblock (MB) of each frame when a DV video signal is converted to an MPEG signal in the seventh embodiment of the present invention.

FIG. 16 shows the basic procedure for setting the quantizer scale for each macroblock (MB) of each frame in converting a DV video signal to an MPEG video signal by the digital signal conversion method of the seventh embodiment.

First, at step S1, a quantizer number (Q_NO) and a class number (Class) are obtained for each macroblock. This quantizer number (Q_NO) is expressed by a value of 0 to 15 and is common to all the six DCT blocks in the macroblock. The class number (Class) is expressed by a value of 0 to 3 and is provided for each of the six DCT blocks.

Next, at step S2, a quantization parameter (q_param) is calculated for each DCT block in accordance with the following procedure.

Quantization table q_table[4]={9, 6, 3, 0}

Quantization parameter $q\_param = Q\_NO + q\_table[class]$

Specifically, the quantization table has four kinds of values (9, 6, 3, 0), which correspond to the class numbers 0, 1, 2, 3, respectively. For example, when the class number is 2 and the quantizer number 8, the quantization table value 3 corresponding to the class number 2 and the quantizer number 8 are added to produce a quantization parameter of 11.

Next, at step S3, the average of the quantization parameters (q_param) of the six DCT blocks in the macroblock is calculated.

Then, at step S4, the quantizer scale (quantizer_scale) of the MPEG macroblock is found in accordance with the following procedure, and the processing ends.

Quantization table q_table[25] =

{32, 16, 16, 16, 16, 8, 8, 8, 8, 4, 4, 4, 2, 2, 2, 2, 2, 2, 2, 2, 2, 2, 2, 2, 2} quantizer_scale = q_table[q_param]

Specifically, the quantization table has 25 kinds of values (32 to 2), which correspond to the quantization parameters calculated in the above-described manner. The quantization table corresponding to the quantization parameter value of 0 is 32. The quantization table corresponding to the quantization parameter value of 1 is 16. The quantization table corresponding to the quantization parameter value of 5 is 8. For example, when the average value of the quantization parameters found in the above-described manner is 10, the value of 4 corresponding to the quantization parameter value of 10 becomes the quantizer scale value. Through this procedure, the MPEG quantizer scale (quantizer_scale) depending on the target rate is calculated on the basis of the quantization parameter (q_param) for each macroblock within each frame. The corresponding relation between the class number and the quantization table and the relation between the quantization parameter and the quantizer scale are experientially found.

Figure 15:
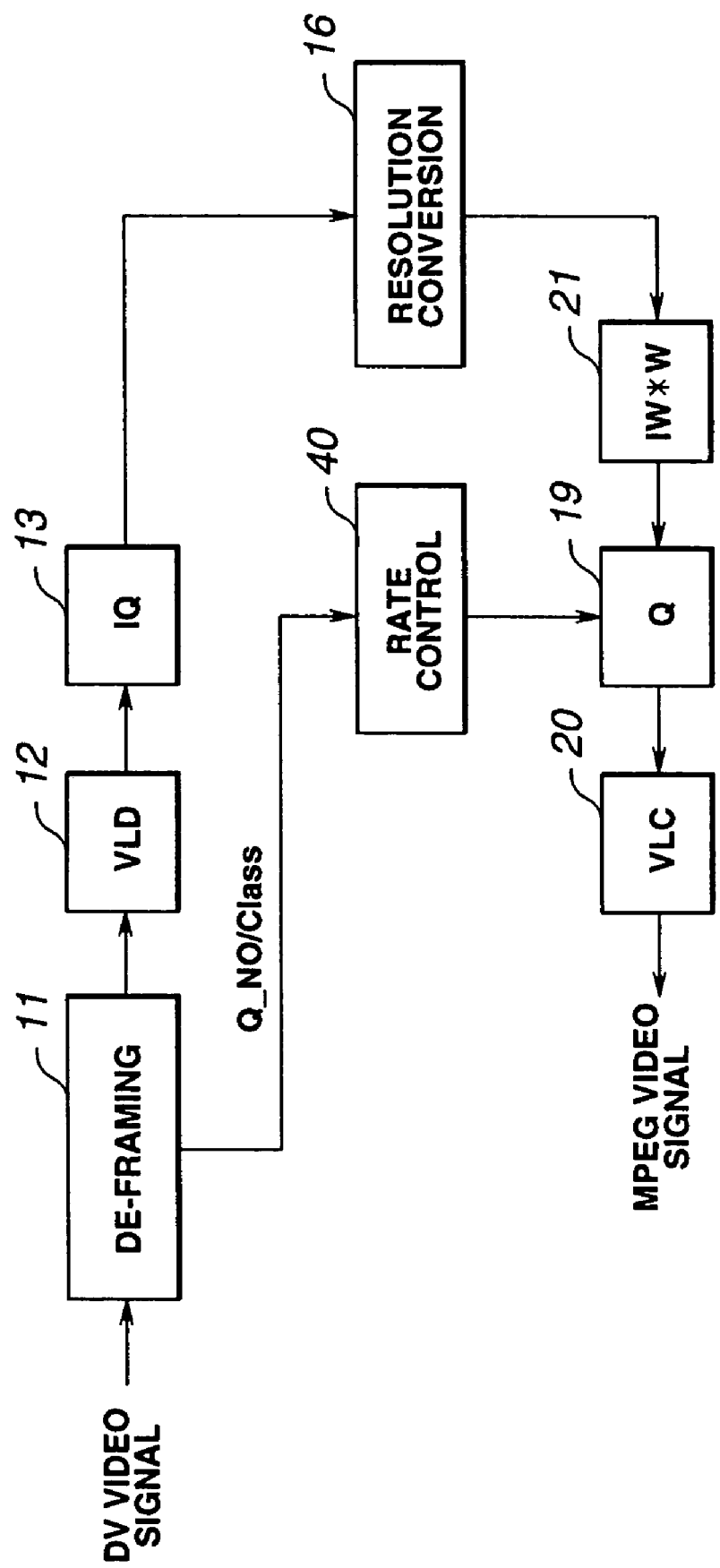
FIG. 15 is a block diagram showing an exemplary structure of a digital signal conversion device according to a seventh embodiment of the present invention.

In the digital signal conversion device of the present invention shown in FIG. 15, the above-described processing is carried out by the rate control section 40 on the basis of the quantization number (Q_NO) and the class number (Class) sent from the de-framing section 11.

Figure 17:
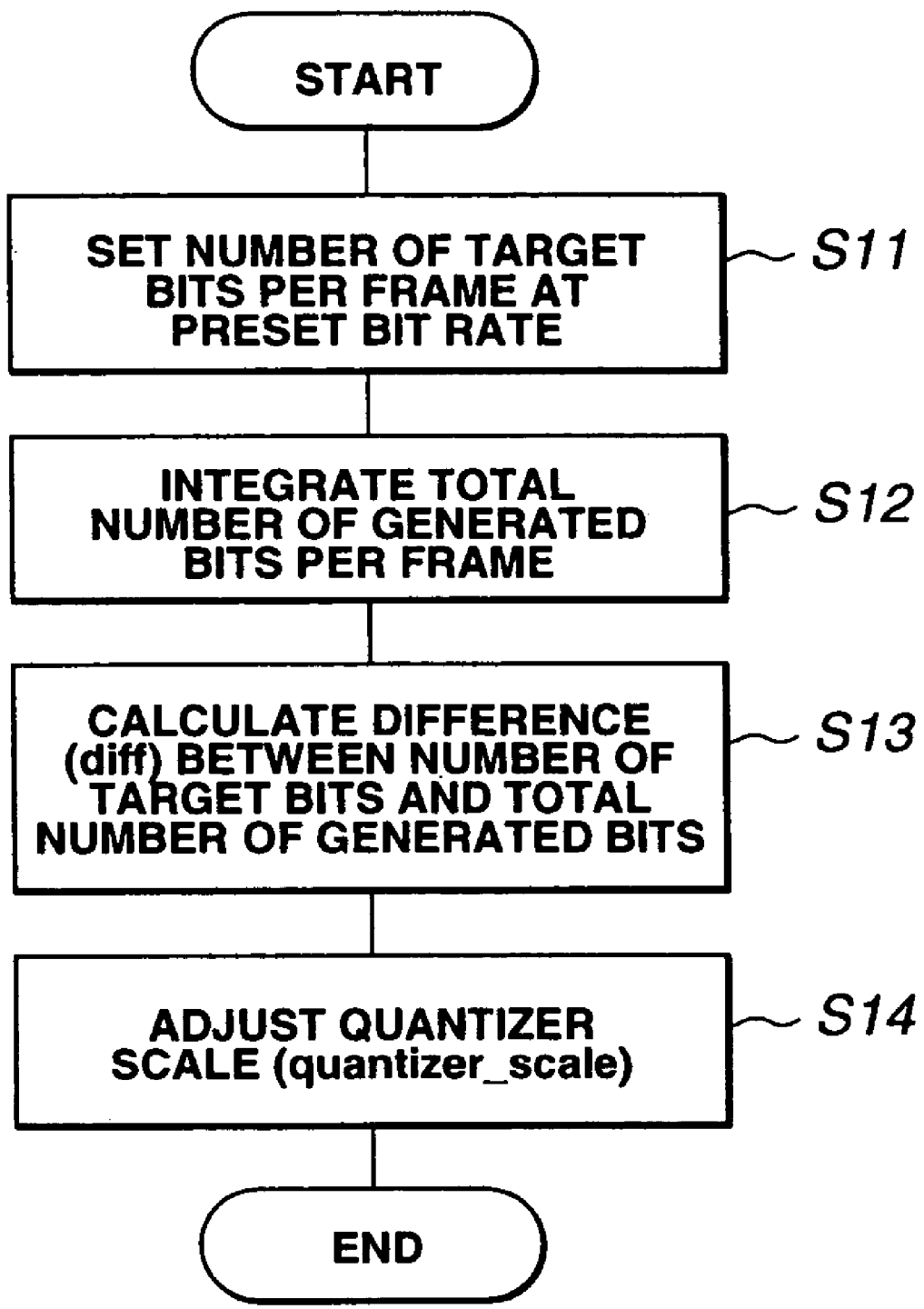
FIG. 17 is a flowchart showing the basic procedure for applying feedback to a next frame by using the preset quantizer scale in the seventh embodiment of the present invention.

FIG. 17 shows the basic procedure for applying feedback to the next frame by using the quantizer scale set in accordance with the above-described procedure.

First, at step S11, the number of target bits per frame at the bit rate set in accordance with the above-described procedure is set.

Next, at step S12, the total number of generated bits per frame is integrated.

Next, at step S13, the difference (diff) between the number of target bits and the total number of generated bits is calculated.

Then, at step S14, the quantizer scale is adjusted on the basis of the result of calculation.

The calculation at each step is expressed as follows.

diff=cont*diff(cont: constant)

q_param=q_param±f(diff)

quantizer_scale=q_table[q_param]

Specifically, normalization is carried out by multiplying the differential value diff found at step S13 by the constant cont. The normalized differential value is multiplied by an experientially found function and added to or subtracted from the quantization parameter. The resultant value is used as the quantization parameter. The value corresponding to this quantization parameter value is selected from the quantization table having 25 kinds of values and is used as the quantizer scale for the next frame.

Through the foregoing procedure, feedback between frames is carried out by calculating the new quantizer scale (quantizer_scale) on the basis of the adjusted quantization parameter (q_param) and using the new quantizer scale for the next frame.

A digital signal conversion method and a digital signal conversion device according to an eighth embodiment of the present invention will now be described. Although the DV format is converted to the MPEG format in the foregoing embodiments, the MPEG format is converted to the DV format in the following embodiment.

Figure 18:
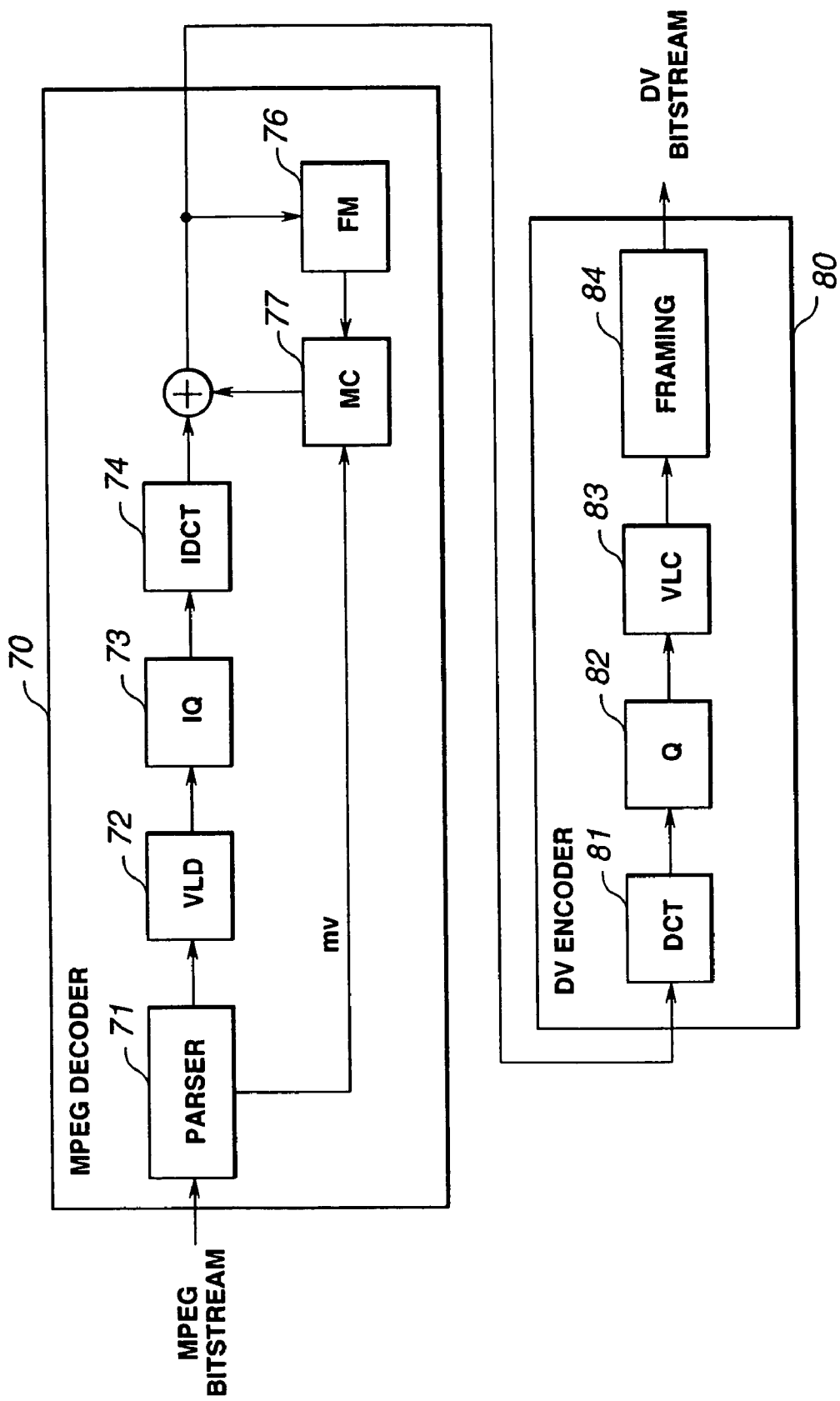
FIG. 18 is a block diagram showing an exemplary structure of a conventional digital signal conversion device for converting an MPEG video signal to a DV video signal.

With reference to FIG. 18, a conventional device for converting the MPEG format to the DV format will be described first.

The digital video signal conversion device shown in FIG. 18 is constituted by an MPEG decoder 70 for decoding MPEG2 video data and a DV encoder 80 for outputting DV video data.

In the MPEG decoder 70, a parser 71, which is supplied with a bit stream of the MPEG2 video data, detects the header of a bit stream of a quantized DCT coefficient framed in accordance with the MPEG2 format and supplies the quantized DCT coefficient coded by variable-length coding to a variable-length decoding (VLD) section 72. Also, the parser 71 extracts a motion vector (mv) and supplies the extracted motion vector to a motion compensation (MC) section 77.

The variable-length decoding (VLD) section 72 carries out variable-length decoding of the quantized DCT coefficient coded by variable-length coding and supplies the variable-length decoding result to an inverse quantizing (IQ) section 73.

The inverse quantizing section 73 carries out inverse quantization by multiplying the quantized DCT coefficient decoded by the variable-length decoding section 72 by the quantization step used on the coding side. Thus, the inverse quantizing section 73 obtains the DCT coefficient and supplies the DCT coefficient to an inverse discrete cosine transform (IDCT) section 74.

The inverse discrete cosine transform section 74 performs inverse DCT on the DCT coefficient from the inverse quantizing section 73, thus restoring the DCT coefficient to data of the spatial domain, that is, pixel data. Specifically, by inverse DCT, pixel values (luminance Y and color difference Cr, Cb) are calculated for each block consisting of 8×8 pixels. In the case of an I-picture, the pixel value is the actual pixel value itself. However, in the case of a P-picture and a B-picture, the pixel value is the differential value between the corresponding pixel values.

The motion compensation section 77 generates a motion compensation output by using picture information stored in two frame memories FM of a frame memory (FM) section 76 and the motion vector mv extracted by the parser 71, and supplies this motion compensation output to an adder 75.

The adder 75 adds the motion compensation output to the differential value from the inverse discrete cosine transform section 74 and supplies decoded picture data to a discrete cosine transform (DCT) section 81 of the DV encoder 80 and the frame memory section 76.

In the DV encoder 80, the discrete cosine transform section 81 performs DCT processing on the decoded picture data to again convert the decoded picture data to the data of the orthogonal transform domain, that is, the DCT coefficient, and supplies the DCT coefficient to a quantizing (Q) section 82.

The quantizing section 82 quantizes the DCT coefficient by using a matrix table in consideration of the visual characteristics and supplies the quantization result as an I-picture of the DV format to a variable-length coding (VLC) section 83.

The variable-length coding section 83 compresses the I-picture of the DV format by carrying out variable-length coding processing and supplies the compressed I-picture to a framing section 84.

The framing section 84 frames the DV format data on which variable-length coding processing is performed and outputs a bit stream of the DV video data.

Meanwhile, orthogonal transform such as discrete cosine transform (DCT) and inverse transform thereof generally require a large quantity of calculation and therefore raise a problem that format conversion of video data as described above cannot be carried out efficiently. Since errors are accumulated along with the increase in the calculation quantity, there is also a problem that the signal is deteriorated.

Thus, a digital video signal conversion device according to the eighth embodiment to solve these problems will be described with reference to FIG. 19.

Figure 19:
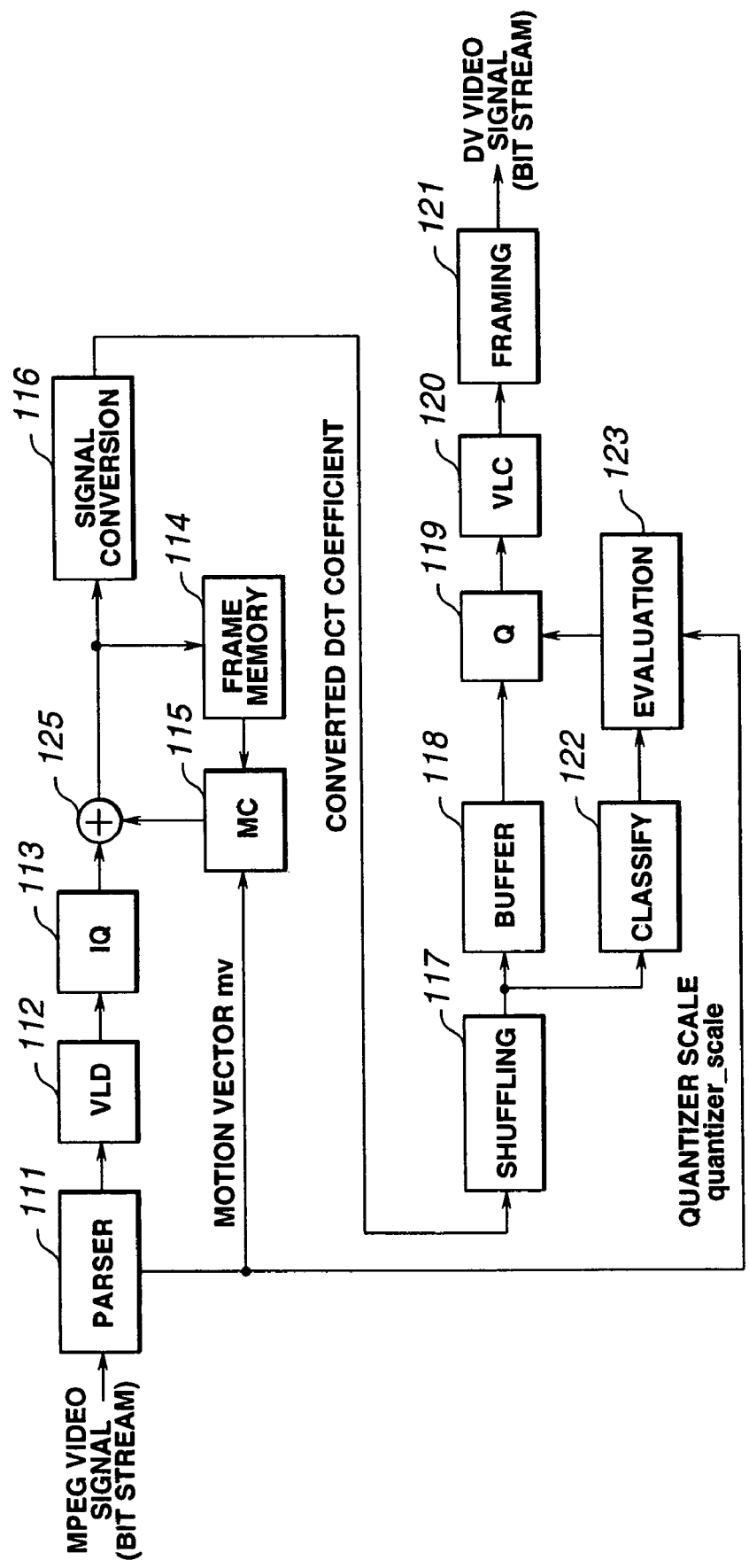
FIG. 19 is a block diagram showing an exemplary structure of a digital signal conversion device according to an eighth embodiment of the present invention.

In the digital signal conversion device shown in FIG. 19, an MPEG video signal in conformity to the MPEG format as described above is inputted as a first digital signal, and a DV signal is outputted as a second digital signal.

A parser 111 extracts motion information of the image such as the motion vector mv and the quantizer scale with reference to the header of the MPEG video signal as the digital signal of the first format.

The motion vector mv is sent to a motion compensation (MC) section 115, where motion compensation is carried out. The quantizer scale (quantizer_scale) is sent to an evaluating section 123, which will be described later.

A variable-length decoding (VLD) section 112 carries out variable-length decoding on the bit stream of the MPEG video signal from which necessary information is extracted by the parser 111.

An inverse quantizing (IQ) section 113 inversely quantizes the MPEG video signal decoded by the variable-length decoding section 112.

Then, the MPEG video signal inversely quantized by the inverse quantizing section 113 is inputted to an adder 125. To this adder 125, the result of motion compensation for the motion vector mv from the parser 111 is also inputted from the motion compensation section 115.

The output from the adder 125 is sent to a signal converting section 116, which will be described later, and is also inputted to the motion compensation section 115 through a frame memory 114. The signal converting section 116 performs required signal conversion processing such as resolution conversion in the orthogonal transform domain (frequency domain) on the video signal inputted through the adder 125.

The video signal on which required signal conversion processing is performed by the signal converting section 116 is shuffled by a shuffling section 117 and is then sent to a buffer 118 and a classifying section 122.

The video signal sent to the buffer 118 is sent to a quantizing (Q) section 119 and is quantized by this quantizing section 119. Then, the video signal is variable-length coded by a variable-length coding (VLC) section 120. In addition, the video signal is framed by a framing section 121 and outputted as a bit stream of the DV video signal.

On the other hand, the classifying section 122 classifies the video signal shuffled by the shuffling section 117 and sends the result of classification as class information to the evaluating section 123.

The evaluating section 123 determines the quantization number at the quantizing section 119 on the basis of the class information from the classifying section 122 and the quantizer scale (quantizer_scale) from the parser 111.

With such a structure, since the data quantity of the DV video signal outputted as the video signal of the second format can be determined on the basis of the data quantity information included in the MPEG video signal inputted as the video signal of the first format, processing for determining the data quantity of the video signal of the second format generated by signal conversion can be simplified.

The above-described seventh and eighth embodiments can also be applied to the case where one of the digital signal of the first format and the digital signal of the second format is an MPEG1 video signal while the other is an MPEG2 video signal.

A digital signal conversion method and a digital signal conversion device according to a ninth embodiment of the present invention will now be described with reference to FIG. 20.

The digital signal conversion device is a device for converting MPEG video data conforming to the MPEG2 format to DV video data conforming to the DV format. It is assumed that these data are data of the PAL system.

In the case where the video signal is a signal of the PAL system, the signals conforming to the MPEG2 format and the DV format have a resolution of 720×576 pixels and a ratio of the sampling frequency of a luminance signal to the sampling frequencies of two color-difference signals equal to 4:2:0. Therefore, resolution conversion processing need not be carried out with respect to either the Y signal or the C signal.

Figure 20:
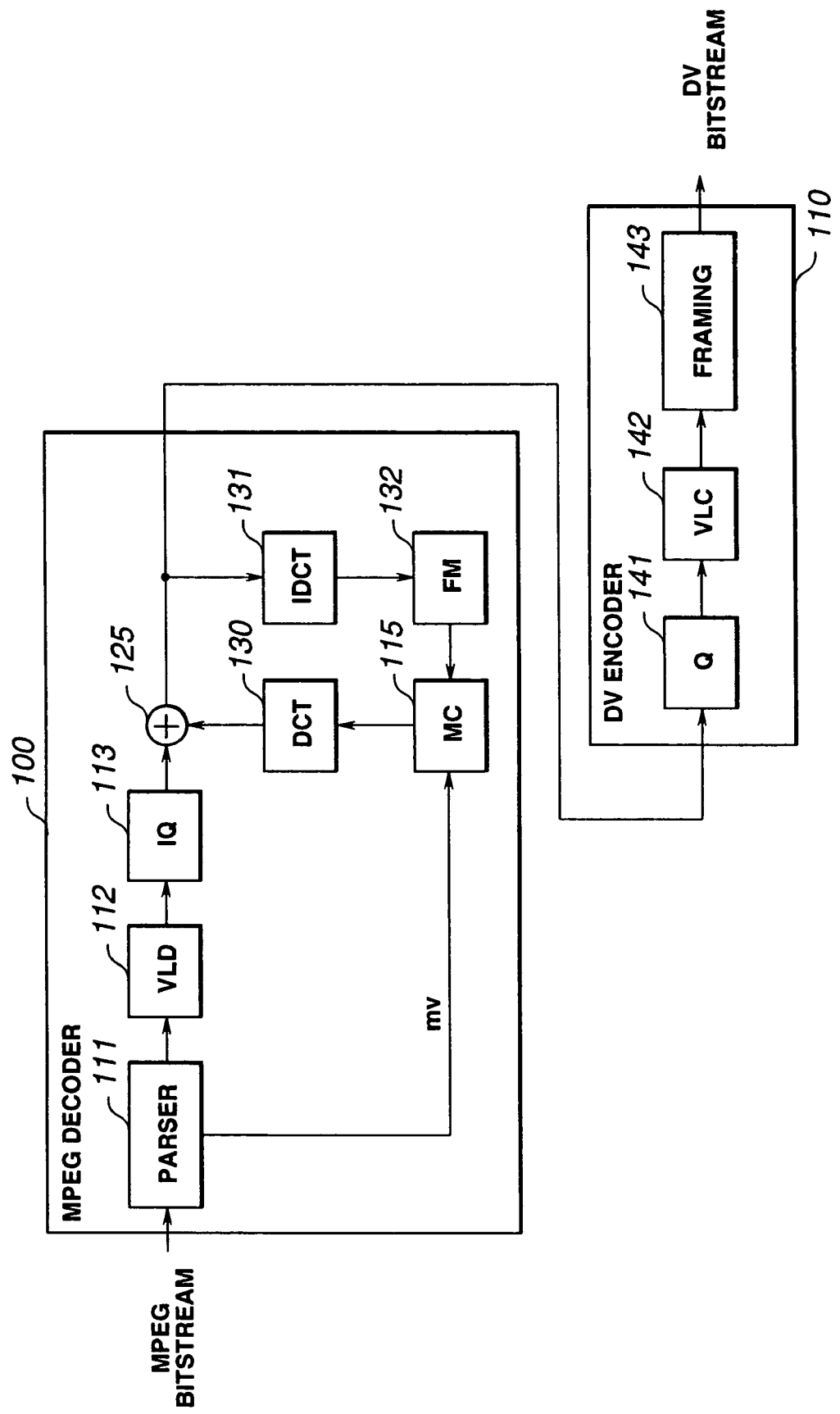
FIG. 20 is a block diagram showing an exemplary structure of a digital signal conversion device according to a ninth embodiment of the present invention.

In FIG. 20, an MPEG decoder 100 has a parser 111, a variable-length decoding (VLD) section 112, an inverse quantizing (IQ) section 113, an adder 125, an inverse discrete cosine transform (IDCT) section 131, a frame memory (FM) section 132, a motion compensation (MC) section 115, and a discrete cosine transform (DCT) section 130. The frame memory (FM) section 132 is so constituted as to be used as two predictive memories.

As will be later described in detail, the inverse discrete cosine transform section 131 carries out inverse discrete cosine transform processing on an I-picture and a P-picture partially decoded by the variable-length decoding section 112 and the inverse quantizing section 113. The motion compensation section 115 generates a motion compensation output on the basis of the inverse discrete cosine transform output. The discrete cosine transform section 130 carries out discrete cosine transform on the motion compensation output. The adder 125 adds the motion compensation output from the discrete cosine transform section 130 to a P-picture and a B-picture partially decoded by the variable-length decoding section 112 and the inverse quantizing section 113.

The overall operation will be described hereinafter. First, the parser 111 restores the quantized DCT coefficient framed in conformity to the MPEG2 format to a variable-length code with reference to the header of the MPEG2 video data inputted as a bit stream, and supplies the variable-length code to the variable-length decoding-section 112. Also, the parser 111 extracts the motion vector (mv) and supplies the extracted motion vector to the motion compensation section 115.

The variable-length decoding section 112 carries out variable-length decoding of the quantized DCT coefficient restored to the variable-length code, and supplies the variable-length decoding result to the inverse quantizing section 113.

The inverse quantizing section 113 carries out inverse quantization processing by multiplying the quantized DCT coefficient decoded by the variable-length decoding section 112 by the quantization step used on the coding side. The inverse quantizing section 113 thus obtains the DCT coefficient and supplies the DCT coefficient to the adder 125. The DCT coefficient obtained by the variable-length decoding section 112 and the inverse quantizing section 113 is supplied to the adder 125 as an output which will not be restored to pixel data by inverse discrete cosine transform, that is, as partially decoded data.

The adder 125 is also supplied with the motion compensation output from the motion compensation section 115, which is orthogonally transformed by the discrete cosine transform section 130. Then, the adder 125 adds the motion compensation output to the partially decoded data in the orthogonal transform domain. The adder 125 supplies the addition output to a DV encoder 110 and also to the inverse discrete cosine transform section 131.

The inverse discrete cosine transform section 131 performs inverse discrete cosine transform processing on an I-picture or a P-picture within the addition output, thus generating data of the spatial domain. This data of the spatial domain is reference picture data used for motion compensation. The reference picture data for motion compensation is stored in the frame memory section 132.

The motion compensation section 115 generates the motion compensation output by using the reference picture data stored in the frame memory section 132 and the motion vector mv extracted by the parser 111, and supplies the motion compensation output to the discrete cosine transform section 130.

The discrete cosine transform section 130 restores the motion compensation output processed in the spatial domain to the orthogonal transform domain as described above and then supplies the motion compensation output to the adder 125.

The adder 125 adds the DCT coefficient of the motion compensation output from the discrete cosine transform section 130 to the DCT coefficient of the differential signal from the partially decoded P- and B-pictures from the inverse quantizing section 113. Then, the addition output from the adder 125 is supplied as partially decoded data in the orthogonal transform domain to the DV encoder 110 and the inverse discrete cosine transform section 131.

Since the partially decoded I-picture from the inverse quantizing section 113 is an intra-frame coded image signal, motion compensation addition processing is not necessary. The partially decoded I-picture is supplied as it is to the inverse discrete cosine transform section 131 and is also supplied to the DV encoder 110.

The DV encoder 110 includes a quantizing (Q) section 141, a variable-length coding (VLC) section 142, and a framing section 143.

The quantizing section 141 quantizes the decoded output, that is, the DCT coefficient, of the I-picture, P-picture and B-picture in the orthogonal transform domain from the MPEG decoder 100, and supplies the quantized DCT coefficient to the variable-length coding section 142.

The variable-length coding section 142 carries out variable-length coding processing of the quantized DCT coefficient and supplies the coded data to the framing section 143. The framing section 143 frames the compression-coded data from the variable-length coding section 142 and outputs a bit stream of DV video data.

In this manner, when the MPEG2 video data to be converted is an I-picture, the MPEG decoder 100 causes the variable-length decoding section 112 and the inverse quantizing section 113 to partially decode the MPEG2 video data to the orthogonal transform domain, and the DV encoder 110 causes the quantizing section 141 and the variable-length coding section 142 to partially code the video data. At the same time, the MPEG decoder 100 causes the inverse discrete cosine transform section 131 to perform inverse discrete cosine transform on the I-picture and stores the resultant I-picture into the frame memory section 132 as a reference picture for the P/B-picture.

On the other hand, when the MPEG2 video data to be converted is a P-picture or a B-picture, only the processing for generating the motion compensation output is carried out in the spatial domain by using the inverse discrete cosine transform section 131, and the processing for constituting the frame in addition to the differential signal as the P-picture or B-picture partially decoded by the variable-length decoding section 112 and the inverse quantizing section 113 is carried out in the discrete cosine transform domain by using the discrete cosine transform section 130, as described above. After that, partial encoding is carried out by the DV encoder 110.

Particularly, in the case of the P-picture, a macroblock at a position indicated by the motion vector mv is taken out from the I-picture processed by inverse discrete cosine transform by the inverse discrete cosine transform section 131, by motion compensation processing by the motion compensation section 115. Discrete cosine transform processing is performed on the macroblock by the discrete cosine transform section 130 and is added to the DCT coefficient of the P-picture as a differential signal in the discrete cosine transform domain by the adder 125. This processing is based on that the result of discrete cosine transform performed on the addition result in the spatial domain is equivalent to the result of addition of data processed by discrete cosine transform. This result is partially encoded by the DV encoder 110. At the same time, as a reference for the next B-picture, inverse discrete cosine transform is performed on the addition output from the adder 125 by the inverse discrete cosine transform section 131 and the resultant data is stored in the frame memory section 132.

In the case of the B-picture, a macroblock at a position indicated by the motion vector mv is taken out from the P-picture which is processed by inverse discrete cosine transform by the inverse discrete cosine transform section 131. Then, discrete cosine transform is carried out on the macroblock by the discrete cosine transform section 130, and the DCT coefficient of the B-picture as a differential signal is added thereto in the discrete cosine transform domain. In the bidirectional case, macroblocks from two reference frames are taken out and the average thereof is used.

The result is partially encoded by the DV encoder 110. Since the B-picture does not become a reference frame, inverse discrete cosine transform need not be carried out by the inverse discrete cosine transform section 131.

While both inverse discrete cosine transform (IDCT) and discrete cosine transform (DCT) processing are conventionally required to decode an I-picture, the digital video signal conversion device according to the above-described ninth embodiment only requires IDCT for reference.

To decode a P-picture, DCT and IDCT processing for reference are necessary. However, while both DCT and IDCT are conventionally required to decode a B-picture, the digital video signal conversion device according to the embodiment only requires DCT and needs no IDCT.

In the case of typical MPEG2 data having the number of GOPs N=15 and the forward predictive picture spacing M=3, one I-picture, four P-pictures, and 10 B-pictures are included. On the assumption that the calculation quantity of DCT and that of IDCT are substantially equal, when weighting is omitted, the MPEG2 data per 15 frames is expressed by $$2 \times DCT \times (1/15) + 2 \times DCT \times (4/15) + 2 \times DCT \times (10/15) = 2 \times DCT$$

in the case of the conventional technique, and is expressed by $$1 \times DCT \times (1/15) + 2 \times DCT \times (4/15) + 1 \times DCT \times (10/15) = 1.2666 \times DCT$$

in the case of the digital video signal conversion device shown in FIG. 20. Thus, the calculation quantity can be significantly reduced. DCT in these equations represents the calculation quantity.

That is, in the digital video signal conversion device shown in FIG. 20, the quantity of data calculation processing for format conversion from MPEG2 video data to DV video data can be significantly reduced.

A digital video signal conversion device according to a tenth embodiment of the present invention will now be described with reference to FIG. 21.

In this tenth embodiment, too, a digital video signal conversion device for converting MPEG video data conforming to the MPEG2 format to DV video data conforming to the DV format is employed. However, it is assumed that the MPEG2 video data is a compressed video signal of a high resolution, for example, 1440×1080 pixels.

For example, when an MPEG2 video signal is applied to a digital broadcasting service, the signal is classified in accordance with the profile (function)/level (resolution). A video signal of the main profile/high level (MP@HL) used for a digital HDTV in the United States has a high resolution, as described above, and this signal is converted to the DV video data.

Figure 21:
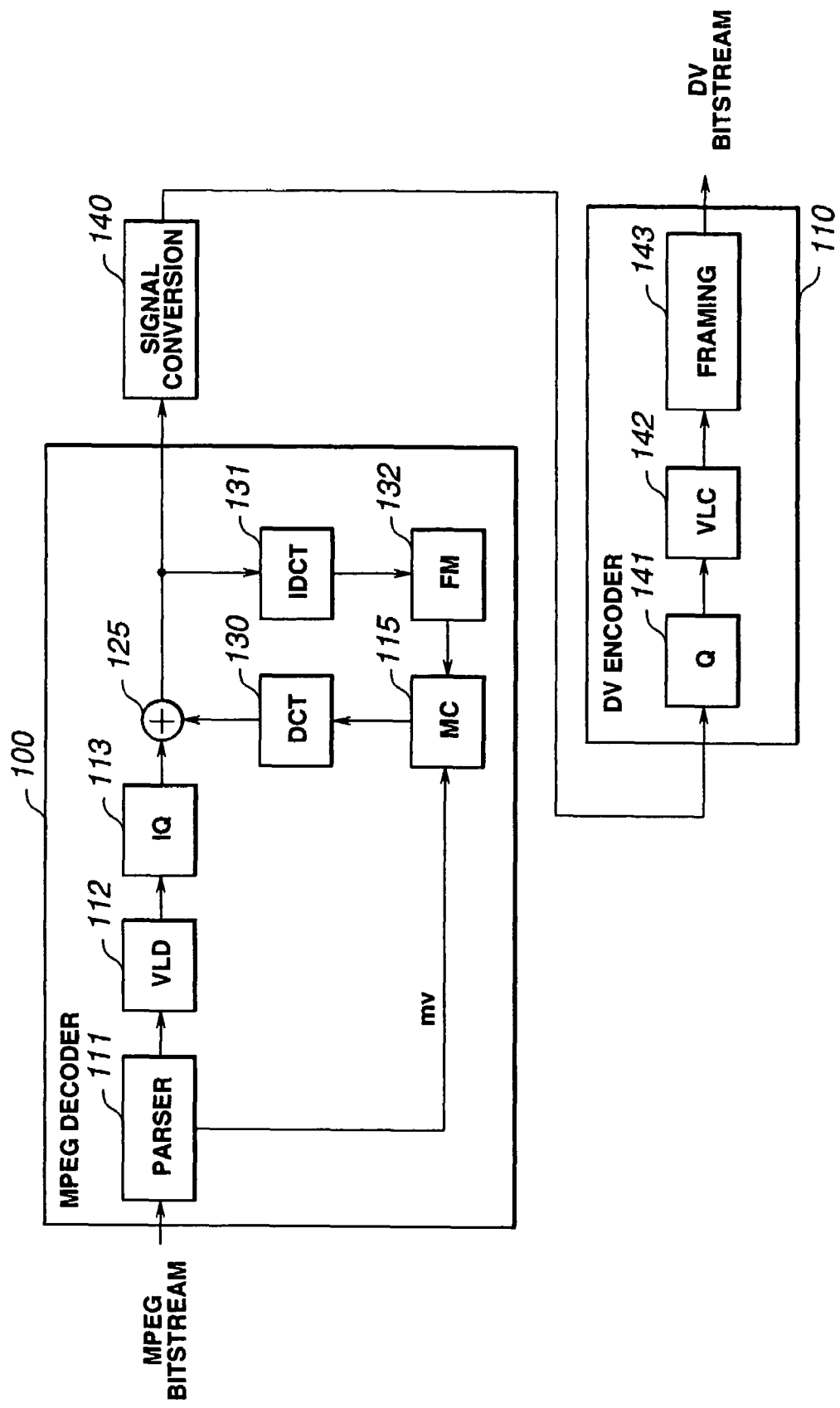
FIG. 21 is a block diagram showing an exemplary structure of a digital signal conversion device according to a tenth embodiment of the present invention.

Therefore, the digital video signal conversion device shown in FIG. 21 has such a structure that a signal converting section 140 for carrying out the above-described conversion processing is provided between the MPEG decoder 100 and the DV encoder 110 of FIG. 20.

This signal converting section 140 carries out resolution conversion processing on the DCT coefficient in the DCT transform domain from the MPEG decoder, by using a transform matrix generated on the basis of an inverse orthogonal transform matrix corresponding to the orthogonal transform matrix used for DCT coding performed on the MPEG coded data and an orthogonal transform matrix corresponding to the inverse orthogonal transform matrix used for IDCT coding for obtaining a signal conversion output signal in the time domain.

The DCT coefficient as a resolution conversion output from this signal converting section 140 is supplied to the DV encoder 110.

The DV encoder 110 carries out quantization and variable-length coding on the DCT coefficient as the resolution conversion output, then frames the DCT coefficient, and outputs a bit stream of DV video data.

Thus, in this digital video signal conversion device, the video signal of the main profile/high level (MP@HL) within the MPEG video signal is resolution-converted by the signal converting section 140 and then coded by the DV encoder to generate the DV video data.

Similarly to the digital video signal conversion device of FIG. 20, with respect to an I-picture, the digital video signal conversion device of this tenth embodiment only requires IDCT for reference, whereas both IDCT and DCT processing are conventionally required.

With respect to a P-picture, DCT and IDCT for reference are carried out as in the conventional technique. With respect to a B-picture, this digital video signal conversion device only requires DCT and needs no IDCT, while both DCT and IDCT are conventionally required.

That is, in the digital video signal conversion device of FIG. 21, too, the quantity of data calculation processing for format conversion from MPEG2 video data of a high resolution to DV video data can be significantly reduced.

As the resolution conversion processing carried out by the signal converting section 140, resolution conversion for contraction is mainly described. However, enlargement is also possible. Specifically, in general, the resolution can be enlarged at an arbitrary magnification by adding a high-frequency component to an input digital signal of the frequency domain. For example, format conversion from MPEG1 video data to the DV video data is carried out.

The above-described processing may also be carried out by means of software.

Meanwhile, in the above-described compression system of the MPEG format or the DV format, a hybrid compression coding method using orthogonal transform coding in combination with predictive coding is employed in order to efficiently compression-code still image data or dynamic image data.

When orthogonal transform and predictive coding along with motion compensation are carried out again after resolution conversion processing is carried out on an input information signal which is compression-coded by the hybrid compression coding method, the motion vector must be estimated at the step of carrying out re-predictive coding processing.

If predictive coding is carried out again with perfectly the same resolution without carrying out resolution conversion processing, the motion vector at the time of predictive coding may be used. However, if the resolution is converted, the conversion distortion is changed. Therefore, the motion vector used at the re-predictive coding step is also changed.

Thus, the motion vector needs to be estimated at the re-predictive coding step. However, the quantity of arithmetic processing is required for estimation of the motion vector.

To eliminate this problem, a digital signal conversion device according to an eleventh embodiment is used. In the digital signal conversion method and device according to the eleventh embodiment, an input information signal which is compression-coded by hybrid compression coding using orthogonal transform coding in combination with predictive coding is processed by signal conversion processing such as resolution conversion in the time domain or the orthogonal transform domain and then restored to the orthogonal transform domain for re-compression coding, or compression-coded in the orthogonal transform domain.

The above-described hybrid compression coding is exemplified by H.261 and H.263 recommended by ITU-T (International Telecommunication Union-Telecommunication Standardization Section), and MPEG and DV coding standards.

The H.261 standard is an image coding standard for a low bit rate and is developed mainly for teleconference and video phone through ISDN. The H.263 standard is an improved version of H.261 for the GSTN video phone system.

The eleventh embodiment will now be described with reference to FIG. 22. In the digital video signal conversion device of the eleventh embodiment, MPEG coded data conforming to the MPEG format is inputted and processed by resolution conversion processing as signal conversion processing, and the resolution-converted MPEG coded data is outputted.

Figure 22:
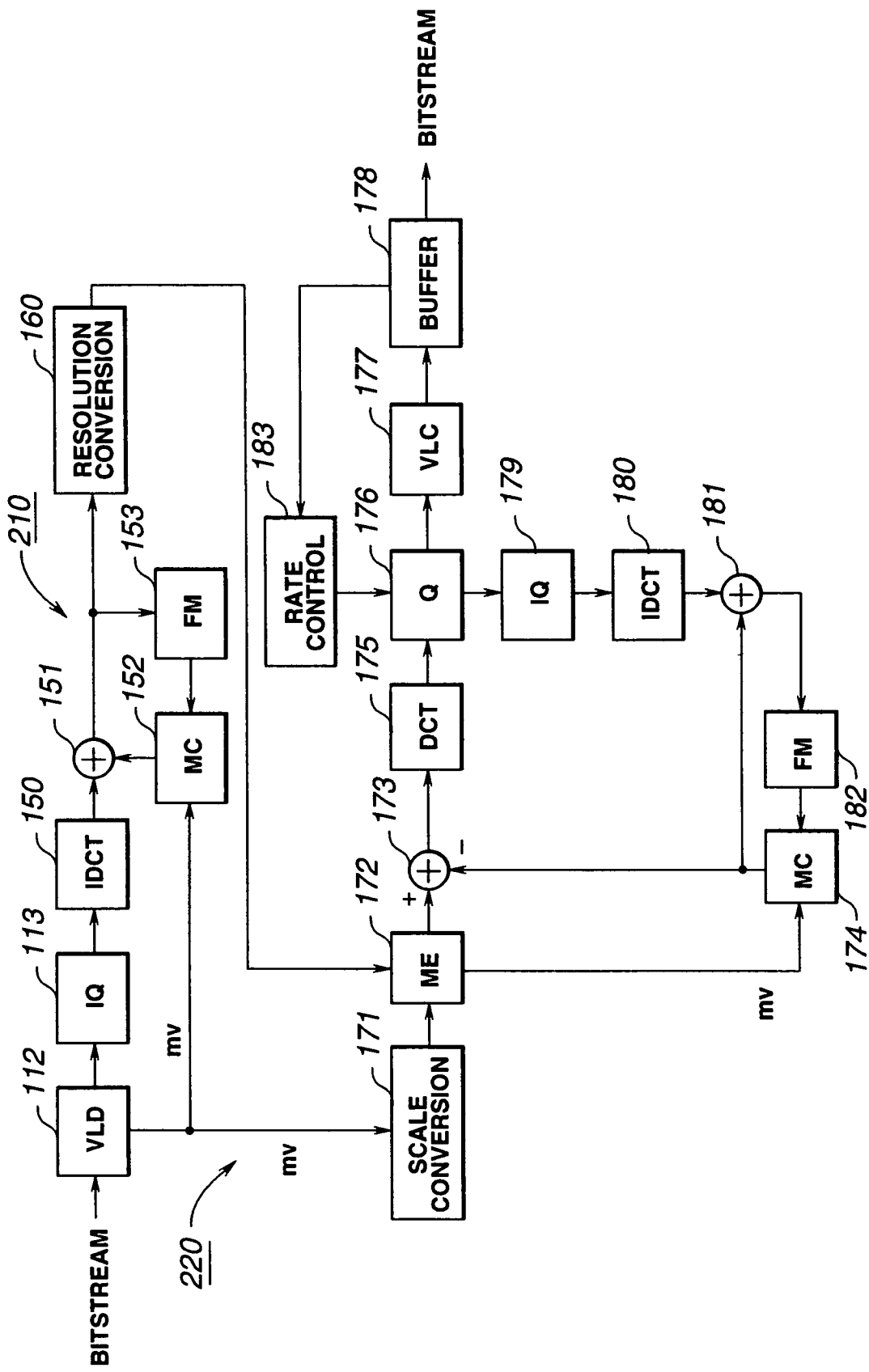
FIG. 22 is a block diagram showing an exemplary structure of a digital signal conversion device according to a eleventh embodiment of the present invention.

This digital video signal conversion device has a decoding section 210 for carrying out decoding using motion compensation MC with respect to a bit stream of MPEG coded data which is compression-coded along with motion vector (mv) detection, a resolution converting section 160 for performing resolution conversion processing on the decoding output from the decoding section 210, and a coding section 220 for performing compression coding processing along with motion detection based on the motion vector mv added to the MPEG coded data, on the conversion output image from the resolution converting section 160, and outputting a bit stream of video coded data which is resolution-converted, as shown in FIG. 22.

The digital video signal conversion device constituted by these parts will be described hereinafter. It is a matter of course that each constituent part carries out processing of each step of the digital signal conversion method according to the present invention.

The decoding section 210 includes a variable-length decoding (VLD) section 112, an inverse quantizing (IQ) section 113, an inverse discrete cosine transform (IDCT) section 150, an adder 151, a motion compensation (MC) section 152, and a frame memory (FM) section 153. The FM section 153 is constituted by two frame memories FM used as predictive memories.

The VLD section 112 decodes the MPEG coded data, that is, coded data obtained by variable-length coding of the motion vector and the quantized DCT coefficient as additional information, in accordance with variable-length coding, and extracts the motion vector mv. The IQ section 113 carries out inverse quantization processing by multiplying the quantized DCT coefficient decoded by the VLD section 112 by the quantization step used on the coding side, thus obtaining the DCT coefficient.

The IDCT section 150 performs inverse DCT on the DCT coefficient from the IQ section 113, thus restoring the DCT coefficient to data of the spatial domain, that is, pixel data. Specifically, by inverse DCT, the respective pixel values (luminance Y and color-difference Cr, Cb) are calculated for each block consisting of 8×8 pixels. In the case of an I-picture, the pixel value is the actual pixel value itself. However, in the case of a P-picture and a B-picture, the pixel value is the differential value between the corresponding pixel values.

The MC section 152 performs motion compensation processing on the image information stored in the two frame memories of the FM section 153 by using the motion vector mv extracted by the VLD section 112, and supplies the motion compensation output to the adder 151.

The adder 151 adds the motion compensation output from the MC section 152 to the differential value from the IDCT section 150, thus outputting a decoded image signal. The resolution converting section 160 carries out required resolution conversion processing on the decoded image signal. The conversion output from the resolution converting section 160 is supplied to the coding section 220.

The coding section 220 includes a scale converting section 171, a motion estimation (ME) section 172, an adder 173, a DCT section 175, a rate control section 183, a quantizing (Q) section 176, a variable-length coding (VLC) section 177, a buffer memory 178, an IQ section 179, an IDCT section 180, an adder 181, an FM section 182, and an MC section 174.

The scale converting section 171 carries out scale conversion of the motion vector mv extracted by the VLD section 112 in accordance with the resolution conversion rate used by the resolution converting section 160. For example, if the resolution conversion rate used by the resolution converting section 160 is ½, the motion vector mv is converted to the scale of ½.

The ME section 172 searches a narrow range of the conversion output from the resolution converting section 160 by using scale conversion information from the scale converting section 171, thus estimating the optimum motion vector at the converted resolution.

The motion vector estimated by the ME section 172 is used at the time of motion compensation carried out by the MC section 174. The conversion output image from the resolution converting section 160 used for estimation of the motion vector by the ME section 172 is supplied to the adder 173.

The adder 173 calculates the difference between a reference picture which will be later described and the conversion output from the resolution converting section 160, and supplies the difference to the DCT section 175.

The DCT section 175 carries out discrete cosine transform of the difference between the reference picture obtained by motion compensation by the MC section 174 and the conversion output picture, by using a block size of 8×8. With respect to an I-picture, since intra-frame coding is carried out, DCT arithmetic operation is directly carried out without calculating the difference between frames.

The quantizing (Q) section 176 quantizes the DCT coefficient from the DCT section 175 by using a matrix table in consideration of the visual characteristics. The VLC section 177 compresses the quantized DCT coefficient from the Q section 176 by using variable-length coding.

The buffer memory 178 is a memory for maintaining a constant transfer rate of the coded data which is compressed by variable-length coding by the VLC section 177. From this buffer memory 178, the resolution-converted video coded data is outputted as a bit stream at a constant transfer rate.

The rate control section 183 controls the increase/decrease in the quantity of generated information in the Q section 176, that is, the quantization step, in accordance with the change information about the increase/decrease in the buffer capacity of the buffer memory 178.

The IQ section 179 constitutes a local decoding section together with the IDCT section 180. The IQ section 179 inversely quantizes the quantized DCT coefficient from the Q section 176 and supplies the DCT coefficient to the IDCT section 180. The IDCT section 180 carries out inverse DCT of the DCT coefficient from the IQ section 179 to restore pixel data and supplies the pixel data to the adder 181.

The adder 181 adds the motion compensation output from the MC section 174 to the pixel data as the inverse DCT output from the IDCT section 180. The image information as the addition output from the adder 181 is supplied to the FM section 182. The image information stored in the FM section 182 is processed by motion compensation by the MC section 174.

The MC section 174 carries out motion compensation on the image information stored in the FM section 182 by using the optimum motion vector estimated by the ME section 172, and supplies the motion compensation output as a reference picture to the adder 173.

The adder 173 calculates the difference between the conversion output picture from the resolution converting section 160 and the reference picture, and supplies the difference to the DCT section 175, as described above.

The DCT section 175, the Q section 176, the VLC section 177 and the buffer memory 178 operate as described above. Ultimately, the resolution-converted video coded data is outputted as a bit stream at a constant transfer rate from this digital video signal conversion device.

In this digital video signal conversion device, when the motion vector is estimated by the ME section 172 of the coding section 220, the motion vector appended to the macroblock of the original compressed video signal is converted in scale by the scale converting section 171 in accordance with the resolution conversion rate in the resolution converting section 160, and the narrow range of the conversion output picture from the resolution converting section 160 is searched on the basis of the scale conversion information from the scale converting section 171 so as to estimate the motion vector for motion compensation, instead of estimating the motion vector in the absence of any information. Thus, since the calculation quantity in the ME section 172 can be significantly reduced, miniaturization of the device and reduction in the conversion processing time can be realized.

A twelfth embodiment will now be described. In this embodiment, too, a digital video signal conversion device for performing resolution conversion processing on an MPEG video signal and outputting a resolution-converted video signal is employed.

Figure 23:
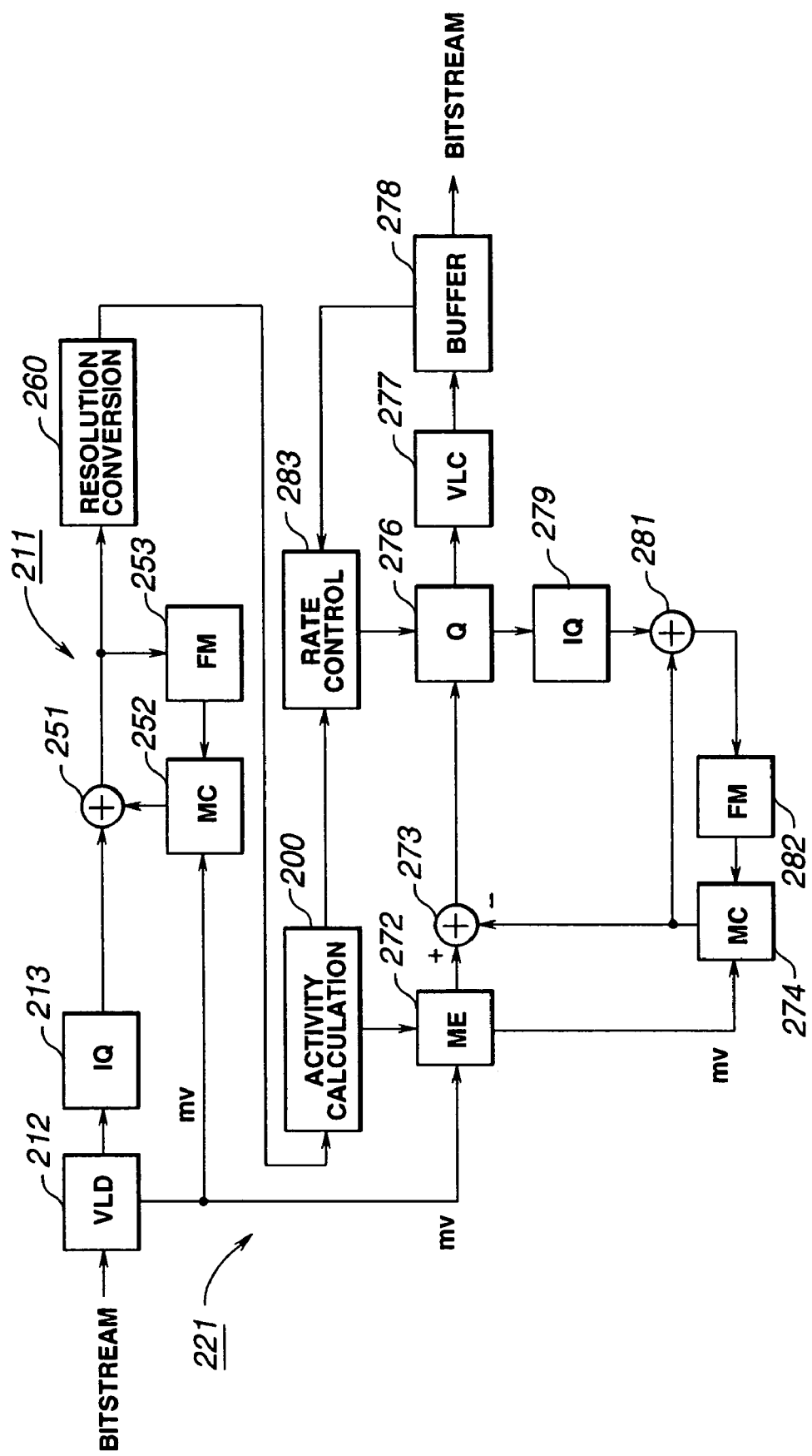
FIG. 23 is a block diagram showing an exemplary structure of a digital signal conversion device according to a twelfth embodiment of the present invention.

This digital video signal conversion device has a decoding section 211 for obtaining decoded data of the orthogonal transform domain by carrying out only predictive decoding processing using MC with respect to MPEG coded data on which the above-described hybrid coding is performed, a resolution converting section 260 for performing resolution conversion processing on the decoded data of the orthogonal transform domain from the decoding section 211, and a coding section 221 for performing compression coding processing along with motion compensation prediction on the conversion output from the resolution converting section 260 by using motion detection based on motion vector information of the MPEG coded data, as shown in FIG. 23.

The digital video signal conversion device constituted by these parts will be described hereinafter. It is a matter of course that each constituent part carries out processing of each step of the digital signal conversion method according to the present invention.

In this digital video signal conversion device, compared with the device shown in FIG. 22, the IDCT section 150 is not necessary in the decoding section 210, and the DCT section 175 and the IDCT section 180 are not necessary in the coding section 220. That is, in this digital video signal conversion device, resolution conversion processing carried out on the decoded data of the DCT domain and the conversion output thereof is coded.

Orthogonal transform such as DCT and inverse orthogonal transform generally require a large calculation quantity. Therefore, resolution conversion as described above may not be carried out efficiently. Also, since errors are accumulated along with the increase in the calculation quantity, the signal might be deteriorated.

Thus, in the digital video signal conversion device of FIG. 23, the IDCT section 150, the DCT section 174 and the IDCT section 180 of FIG. 22 are eliminated and the function of the resolution converting section 160 is changed.

Also, in order to calculate activity which will be later described from the conversion DCT coefficient from the resolution converting section 160 in the DCT domain and estimate the motion vector by using the activity, an activity calculating section 200 is used in place of the scale converting section 171 of FIG. 22.

The resolution converting section 260 shown in FIG. 23 is supplied with an addition output (DCT coefficient) which is obtained by an adder 251 by adding a motion compensation output from an MC section 252 to a DCT coefficient obtained by an IQ section 213 by inversely quantizing a quantized DCT coefficient decoded by a VLD section 212.

This resolution converting section 260 carries out resolution conversion processing on the DCT coefficient of the DCT transform domain from the decoding section 211, by using a transform matrix generated on the basis of an inverse orthogonal transform matrix corresponding to the orthogonal transform matrix used for DCT coding performed on the MPEG coded data and an orthogonal transform matrix corresponding to the inverse orthogonal transform matrix used for IDCT coding for obtaining a signal conversion output signal in the time domain.

The DCT coefficient as the resolution conversion output from the resolution converting section 260 is supplied to the activity calculating section 200. The activity calculating section 200 calculates the spatial activity for each macroblock from the luminance component of the DCT coefficient from the resolution converting section 260. Specifically, the feature of the image is calculated by using the maximum value of the AC value of the DCT coefficient. For example, the existence of fewer high-frequency components indicates a flat image.

An ME section 272 estimates the optimum motion vector at the converted resolution on the basis of the activity calculated by the activity calculating section 200. Specifically, the ME section 272 converts the motion vector mv extracted by the VLD 212 on the basis of the activity calculated by the activity calculating section 200 so as to estimate the motion vector mv, and supplies the estimated motion vector mv to an MC section 274. The ME section 272 estimates the motion vector in the orthogonal transform domain. This motion estimation in the orthogonal transform domain will be described later.

The resolution-converted DCT coefficient from the resolution converting section 260 is supplied to an adder 273 through the activity calculating section 200 and the ME section 272.

The adder 273 calculates the difference between a reference DCT coefficient which will be later described and the converted DCT coefficient from the resolution converting section 260, and supplies the difference to a quantizing (Q) section 276.

The Q section 276 quantizes the differential value (DCT coefficient) and supplies the quantized DCT coefficient to a VLC section 277 and an IQ section 279.

A rate control section 283 controls the increase/decrease in the quantity of generated information in the Q section 276, that is, the quantization step, in accordance with the activity information from the activity calculating section 200 and the change information about the increase/decrease in the buffer capacity of a buffer memory 278.

The VLC section 277 compression-codes the quantized DCT coefficient from the Q section 276 by using variable-length coding and supplies the compressed DCT coefficient to the buffer memory 278. The buffer memory 278 maintains a constant transfer rate of the coded data which is compressed by variable-length coding by the VLC section 277, and outputs the resolution-converted video coded data as a bit stream at a constant transfer rate.

The IQ section 279 inversely quantizes the quantized DCT coefficient from the Q section 276 and supplies the DCT coefficient to the adder 281. The adder 281 adds the motion compensation output from the MC section 274 to the DCT coefficient as the inverse quantization output from the IQ section 279. The DCT coefficient information as the addition output from the adder 281 is supplied to the FM section 282. The DCT coefficient information stored in the FM section 282 is processed by motion compensation by the MC section 274.

The MC section 274 carries out motion compensation on the DCT coefficient information stored in the FM section 282 by using the optimum motion vector estimated by the ME section 272, and supplies the motion compensation output as a reference DCT coefficient to the adder 281.

The adder 273 calculates the difference between the converted DCT coefficient from the resolution converting section 260 and the reference DCT coefficient, and supplies the difference to the Q section 276, as described above.

The Q section 276, the VLC section 277 and the buffer memory 278 operate as described above. Ultimately, the resolution-converted video coded data is outputted at a constant transfer rate from this digital video signal conversion device.

The MC section 274 carries out motion compensation in the orthogonal transform domain similarly to the ME section 272, by using the optimum motion vector estimated by the ME section 272 and the reference DCT coefficient stored in the FM section 282.

Figure 24:
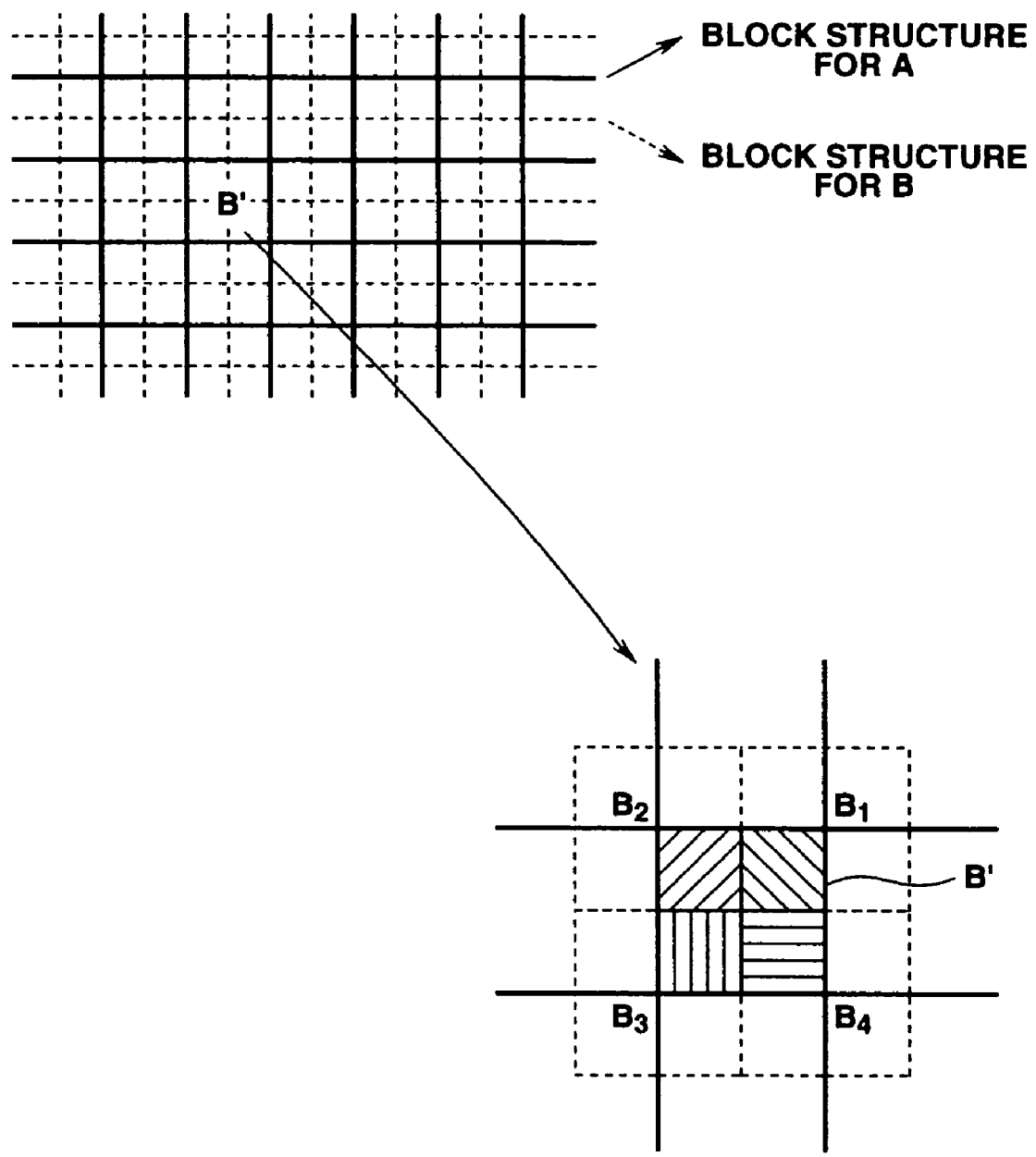
FIG. 24 illustrates motion compensation and motion estimation processing in the orthogonal transform domain in the twelfth embodiment of the present invention, and shows the state where a macroblock B extends over a plurality of macroblocks of a reference picture.

Motion estimation and motion compensation in the orthogonal transform domain will now be described with reference to FIGS. 24 to 26. In FIG. 24, solid lines represent macroblocks of a picture A to be compressed and dotted lines represent macroblocks of a reference picture B. When the picture A to be compressed and the reference picture B are caused to overlap each other by using a motion vector as shown in FIG. 24, the boundaries of macroblocks may not coincide. In the case of FIG. 24, a macroblock B' to be compressed now extends partially on four macroblocks $B_1$, $B_2$, $B_3$ and $B_4$ of the reference picture B. Therefore, no macroblock of the reference picture B corresponds to the macroblock B' one-on-one, and the DCT coefficient of the reference picture B at a position of the macroblock B' cannot be obtained. Thus, it is necessary to obtain the DCT coefficient of the reference picture B of the portion where the macroblock B' is located, by converting the DCT coefficient of the four macroblocks of the reference picture B over which the macroblock B' partially extends.

Figure 25:
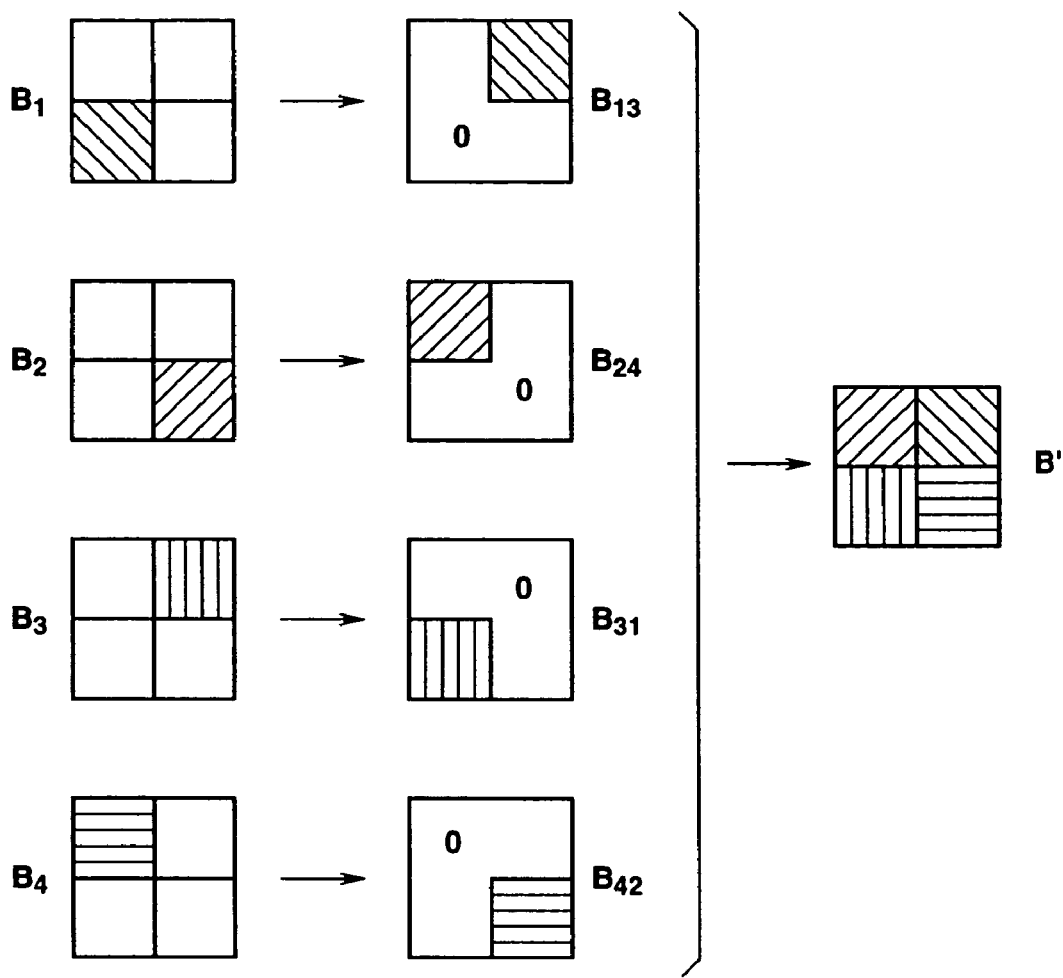
FIG. 25 illustrates motion compensation and motion estimation processing in the orthogonal transform domain in the twelfth embodiment of the present invention, and shows conversion processing of a reference macroblock.
Figure 26:
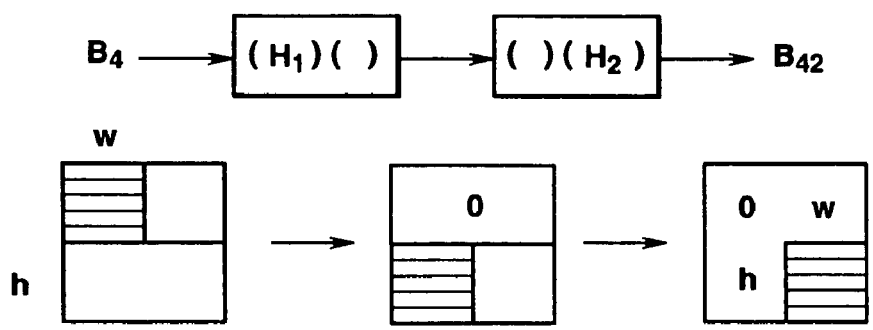
FIG. 26 illustrates motion compensation and motion estimation processing in the orthogonal transform domain in the twelfth embodiment of the present invention, and shows the procedure of conversion of the reference macroblock.

FIG. 25 schematically shows the procedure of this conversion processing. Since the lower left part of the macroblock $B_1$ of the reference picture B overlaps the upper right part of the macroblock B', a macroblock $B_{13}$ is generated by converting the DCT coefficient of the macroblock $B_1$ as will be later described. Similarly, since the lower right part of the macroblock $B_2$ of the reference picture B overlaps the upper left part of the macroblock B', a macroblock $B_{24}$ is generated by converting the DCT coefficient of the macroblock $B_2$ as will be later described. Similar processing is carried out on the macroblocks $B_3$ and $B_4$, thus generating macroblocks $B_{31}$ and $B_{42}$. By combining the four macroblocks $B_{13}$, $B_{24}$, $B_{31}$ and $B_{42}$ thus generated, the DCT coefficient of the reference picture B of the portion where the macroblock B' is located can be obtained.

In short, this processing can be expressed by the following equations (6) and (7).

$$B' = B_{13} + B_{24} + B_{31} + B_{42} \quad (6)$$

$$DCT(B') = DCT(B_{13}) + DCT(B_{24}) + DCT(B_{31}) + DCT(B_{42}) \quad (7)$$

Conversion of the DCT coefficient of the macroblock will now be described with reference to FIG. 26. FIG. 26 shows a mathematical model for finding the partial macroblock $B_{42}$ by calculation from the original block $B_4$ or the like in the spatial domain. Specifically, $B_4$ on the upper left side is extracted, interpolated with 0, and shifted to the lower right side. That is, $B_{42}$ obtained by calculation of the following equation (8) from the block $B_4$ is shown.

$$B_{42} = H_1 \times B_4 \times H_2 \quad (8)$$

$$H_1 = \begin{bmatrix} 0 & 0 \\ I_h & 0 \end{bmatrix}.$$

$$H_2 = \begin{bmatrix} 0 & I_w \\ 0 & 0 \end{bmatrix}$$

In this equation, Ih and Iw are identification codes of a matrix having a size of h×h consisting of h-columns and h-rows and a matrix having a size of w×w consisting of w-columns and w-rows extracted from the block $B_4$. As shown in FIG. 26, with respect to a pre-matrix $H_1$ which is synthesized with $B_4$ first, the first h-column is extracted and converted to the bottom. With respect to H2 which is synthesized with $B_4$ later, the first w-row is extracted and converted to the right side.

On the basis of the equation (8), the DCT coefficient of $B_{42}$ can be calculated directly from the DCT coefficient of $B_4$ in accordance with the following equation (9).

$$DCT(B_{42}) = DCT(H_1) \times DCT(B_4) \times DCT(H_2) \quad (9)$$

This equation is applied to all the subblocks and the total is calculated. Thus, the DCT coefficient of the new block B' can be obtained directly from the DCT coefficients of the original blocks $B_1$ to $B_4$, as expressed by the following equation (10).

$$DCT(B') = \sum_{i=1}^{4} DCT(H_{i1}) \times DCT(B_i) \times DCT(H_{i2}) \quad (10)$$

The DCT coefficients of $H_{i1}$ and $H_{i2}$ may be calculated and stored in a memory in advance so as to constitute a table memory. In this manner, motion estimation and motion compensation can be carried out even in the orthogonal transform domain.

Then, in the coding section 221, when the motion vector is estimated by the ME section 272, the motion vector appended to the macroblock of the original compressed video signal is estimated by searching a narrow range on the basis of the activity calculated by the activity calculating section 200 from the conversion output of the resolution converting section 260, instead of estimating the motion vector in the absence of any information.

As described above, in the decoding section 211 of the digital video signal conversion device of this embodiment, predictive decoding processing along with motion compensation is carried out on the MPEG coded data on which hybrid coding including predictive coding along with motion detection and orthogonal transform coding is performed, that is, inverse quantization is carried out after variable-length decoding. Then, motion compensation is carried out to obtain decoded data which remains in the DCT domain, and resolution conversion is performed on the decoded data of the DCT domain. Therefore, resolution conversion can be directly carried out in the orthogonally transformed domain and decoding (inverse orthogonal transform) to the time domain or spatial domain is not necessary. Thus, the calculation is simplified and conversion of high quality with less computational errors can be carried out. Moreover, in the coding section 221, when the motion vector is estimated by the ME section 272, the motion vector appended to the macroblock of the original compressed video signal is estimated by searching a narrow range on the basis of the activity calculated from the resolution conversion output, instead of estimating the motion vector in the absence of any information. Therefore, as the calculation quantity of the ME section 272 can be significantly reduced, miniaturization of the device and reduction in the conversion processing time can be realized.

A thirteenth embodiment will now be described. In this embodiment, too, a digital video signal conversion device for performing signal conversion processing such as resolution conversion processing on MPEG coded data and outputting video coded data is employed.

Figure 27:
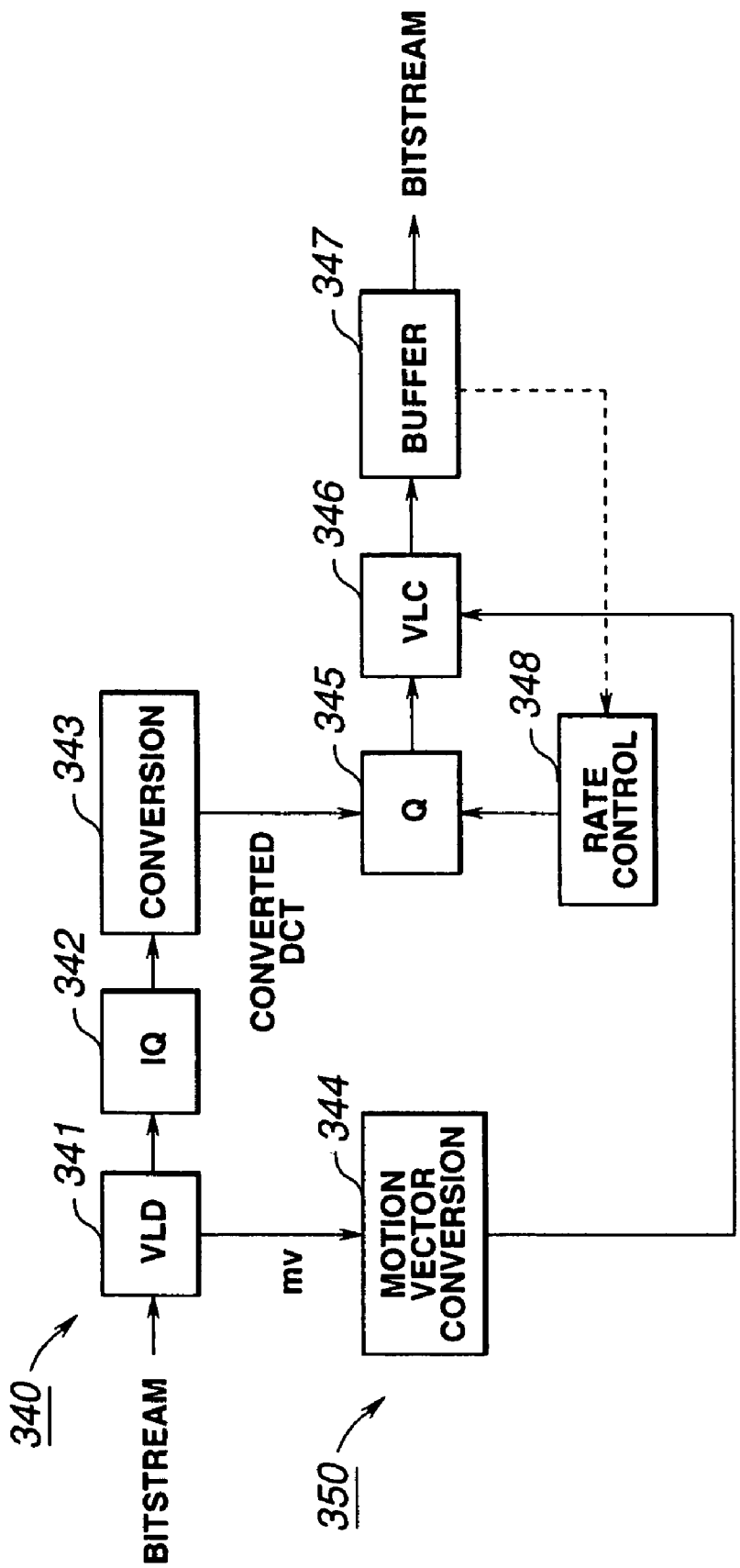
FIG. 27 is a block diagram showing an exemplary structure of a digital signal conversion device according to a thirteenth embodiment of the present invention.

This digital video signal conversion device has a decoding section 340 for obtaining data of the orthogonal transform domain by carrying out partial decoding processing on MPEG coded data on which the above-described hybrid coding is performed, a converting section 343 for performing resolution conversion processing on the data of the orthogonal transform domain from the decoding section 340, and a coding section 350 for adding a motion vector based on motion vector information of the MPEG coded data and performing compression coding processing on the conversion output from the converting section 343, as shown in FIG. 27.

The decoding section 340 includes a VLD section 341 and an IQ section 342. These VLD section 341 and IQ section 342 have the structures similar to those of the VLD section 112 and the IQ section 113 of FIG. 21, respectively, and operate similarly. The characteristic of this decoding section 340 is that motion compensation is not carried out.

Specifically, with respect to a P-picture and a B-picture, resolution conversion is carried out by the converting section 343 with respect to the DCT coefficient as differential information, without carrying out motion compensation. The converted DCT coefficient obtained through resolution conversion is quantized by a Q section 345 which is controlled in rate by a rate control section 348. The DCT coefficient is variable-length coded by a VLC section 346 and then outputted at a constant rate from a buffer memory 347.

In this case, a motion vector converting section 344 of the coding section 350 rescales the motion vector mv extracted by the VLD section 341 in accordance with the resolution conversion rate and supplies the rescaled motion vector to the VLC section 346.

The VLC section 346 adds the rescaled motion vector mv to the quantized DCT coefficient from the Q section 345 and carries out variable-length coding processing. The VLC section 346 then supplies the coded data to the buffer memory 347.

As described above, in the digital video signal conversion device shown in FIG. 27, since motion compensation is not carried out in the decoding section 340 and the coding section 350, the calculation can be simplified and the burden on the hardware can be reduced.

In the above-described digital video signal conversion devices, rate conversion may be carried out. In short, the digital video signal conversion devices may be applied to conversion of the transfer rate from 4 Mbps to 2 Mbps, with the resolution unchanged.

Although the structures of the devices are described in the above-described embodiments, the respective devices may be constituted by using the digital signal conversion method of the present invention as software.

According to the present invention, decoding along with motion compensation is carried out on an input information signal which is compression-coded along with motion detection, and signal conversion processing is carried out on the decoded signal. On this converted signal, compression coding processing along with motion detection based on motion vector information of the input information signal is carried out. When resolution conversion processing is applied as this signal conversion processing, compression coding processing along with motion compensation based on information obtained by scale-converting the motion vector information in accordance with the resolution conversion processing is carried out on the converted signal. Particularly, the motion vector information required at the time of compression coding is converted in scale in accordance with the resolution conversion rate, and a narrow range is searched. Therefore, the calculation quantity at the time of motion vector estimation can be significantly reduced, and miniaturization of the device and reduction in the conversion processing time can be realized.

Also, according to the present invention, partial decoding is carried out on an input information signal on which compression coding including predictive coding along with motion detection and orthogonal transform coding is performed, and a decoded signal of the orthogonal transform domain is thus obtained. Then, signal conversion processing is carried out on the decoded signal of the orthogonal transform domain. On this converted signal, compression coding processing along with motion compensation prediction using motion detection based on motion vector information of the input information signal is carried out. When resolution conversion processing is applied as this signal conversion processing, compression coding processing along with motion compensation based on information obtained by converting the motion vector information in accordance with the activity obtained from the resolution conversion processing is carried out on the converted signal. Therefore, the motion vector information required at the time of compression coding can be estimated by searching a narrow range, and the calculation quantity can be significantly reduced. Thus, miniaturization of the device and reduction in the conversion processing time can be realized. Also, since signal conversion processing can be carried out in the orthogonal transform domain, inverse orthogonal transform processing is not required and decoding (inverse orthogonal transform) to the time domain or spatial domain is not required. Therefore, the calculation is simplified and conversion of high quality with less computational errors can be carried out.

Moreover, according to the present invention, partial decoding is carried out on an input information signal on which compression coding including predictive coding along with motion detection and orthogonal transform coding is performed, and a decoded signal of the orthogonal transform domain is thus obtained. Then, signal conversion processing is carried out on the decoded signal of the orthogonal transform domain. On this converted signal, compression coding processing is carried out by adding motion vector information converted on the basis of motion vector information of the input information signal. Therefore, when resolution conversion processing is applied as this signal conversion processing, compression coding processing by adding information obtained by scale-converting the motion vector information in accordance with the resolution conversion processing is carried out on the converted signal.

That is, since the motion vector information added at the time of compression coding can be estimated by searching a narrow range, and the calculation quantity at the time of motion vector estimation can be significantly reduced. Also, since signal conversion processing can be carried out in the orthogonal transform domain, inverse orthogonal transform processing is not required. In addition, since motion compensation processing is not used at the time of decoding and coding, the calculation quantity can be reduced further.

The invention claimed is:

1. A digital signal conversion method comprising the steps of:
   - a decoding step of carrying out (a) decoding along with motion compensation on an input information signal compression-coded along with motion detection and (b) extracting quantizer scale from the input information signal;
   - a signal conversion processing step of carrying out signal conversion processing on the decoded signal from the decoding step; and
   - a coding processing step of carrying out guantization, based upon the extracted quantizer scale and compression coding processing on the converted signal from the signal conversion processing step along with motion detection based on motion vector information of the input information signal.

2. The digital signal conversion method as claimed in claim 1, wherein at the signal conversion processing step, resolution conversion processing is carried out on the decoded signal.

3. The digital signal conversion method as claimed in claim 2, wherein at the coding processing step, compression coding processing based on information obtained by scale-converting the motion vector information in accordance with the resolution conversion processing is carried out on the converted signal.

4. The digital signal conversion method as claimed in claim 1, wherein at the signal conversion processing step, rate conversion processing is carried out on the decoded signal.

5. A digital signal conversion device comprising:
   - decoding means for carrying out (a) decoding along with motion compensation on an input information signal compression-coded along with motion detection and (b) extracting guantizer scale from the input information signal;

signal conversion processing means for carrying out signal conversion processing on the decoded signal from the decoding means; and coding processing means for carrying out guantization based upon the extracted guantizer scale, and compression coding processing on the converted signal from the signal conversion processing means along with motion detection based on motion vector information of the input information signal.

6. The digital signal conversion device according to claim 5, further comprising:
shuffling section shuffling the converted signal;
classifying section classifying the shuffled signal; and
evaluation section determining a quantization number based on class information from the classifying section and the quantizer scale from the decoding means.

* * * * *

UNITED STATES PATENT AND TRADEMARK OFFICE
CERTIFICATE OF CORRECTION

PATENT NO. : 7,593,464 B2  
APPLICATION NO. : 11/082022  
DATED : September 22, 2009  
INVENTOR(S) : Naofumi Yanagihara et al.

Page 1 of 1

It is certified that error appears in the above-identified patent and that said Letters Patent is hereby corrected as shown below:

Title page Add

Item

--(30) Foreign Application Priority Data

| | | |
|---|---|---|
| November 5, 1997 | JP | P9/303132 |
| November 5, 1997 | JP | P9/303133 |
| November 6, 1997 | JP | P9/304623 |
| November 7, 1997 | JP | P9/305959 |
| November 12, 1997 | JP | P9/310721 |
| November 14, 1997 | JP | P9/314078-- |

Signed and Sealed this

Tenth Day of November, 2009

David J. Kappos  
*Director of the United States Patent and Trademark Office*

UNITED STATES PATENT AND TRADEMARK OFFICE
CERTIFICATE OF CORRECTION

PATENT NO.       : 7,593,464 B2                                    Page 1 of 1
APPLICATION NO.  : 11/082022
DATED            : September 22, 2009
INVENTOR(S)      : Yanagihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Twenty-first Day of September, 2010

David J. Kappos
*Director of the United States Patent and Trademark Office*